(12) United States Patent
Suzuki et al.

(10) Patent No.: US 10,761,375 B2
(45) Date of Patent: Sep. 1, 2020

(54) LIQUID CRYSTAL ALIGNING AGENT, LIQUID CRYSTAL ALIGNMENT FILM AND LIQUID CRYSTAL DISPLAY ELEMENT

(71) Applicant: NISSAN CHEMICAL INDUSTRIES, LTD., Chiyoda-ku (JP)

(72) Inventors: Kanako Suzuki, Funabashi (JP); Yuta Kawano, Funabashi (JP); Kohei Goto, Funabashi (JP); Masaaki Katayama, Funabashi (JP)

(73) Assignee: NISSAN CHEMICAL INDUSTRIES, LTD., Chiyoda-ku (JP)

( * ) Notice: Subject to any disclaimer, the term of this patent is extended or adjusted under 35 U.S.C. 154(b) by 49 days.

(21) Appl. No.: 15/758,380

(22) PCT Filed: Sep. 13, 2016

(86) PCT No.: PCT/JP2016/077012
§ 371 (c)(1),
(2) Date: May 21, 2018

(87) PCT Pub. No.: WO2017/047596
PCT Pub. Date: Mar. 23, 2017

(65) Prior Publication Data
US 2018/0267367 A1     Sep. 20, 2018

(30) Foreign Application Priority Data
Sep. 16, 2015   (JP) .................. 2015-182745

(51) Int. Cl.
| | | |
|---|---|---|
| *G02F 1/1337* | (2006.01) | |
| *C08G 73/10* | (2006.01) | |
| *C09K 19/20* | (2006.01) | |
| *C09K 19/14* | (2006.01) | |
| *C09K 19/58* | (2006.01) | |
| *C08G 73/12* | (2006.01) | |
| *C09K 19/56* | (2006.01) | |
| *C09K 19/04* | (2006.01) | |
| *C09K 19/54* | (2006.01) | |

(52) U.S. Cl.
CPC ....... *G02F 1/133723* (2013.01); *C08G 73/10* (2013.01); *C08G 73/1078* (2013.01); *C08G 73/127* (2013.01); *C09K 19/14* (2013.01); *C09K 19/20* (2013.01); *C09K 19/56* (2013.01); *C09K 19/586* (2013.01); *C09K 19/588* (2013.01); *G02F 1/133788* (2013.01); *C09K 2019/0444* (2013.01); *C09K 2019/548* (2013.01); *G02F 1/133719* (2013.01)

(58) Field of Classification Search
CPC ...................................................... G02F 1/1337
USPC ........................................................ 528/182
See application file for complete search history.

(56) References Cited

FOREIGN PATENT DOCUMENTS

| | | |
|---|---|---|
| JP | 10-123532 A | 5/1998 |
| JP | 2005-154436 A | 6/2005 |
| WO | 2004/053583 A1 | 6/2004 |
| WO | 2013/157586 A1 | 10/2013 |

OTHER PUBLICATIONS

WO 2013/157586 translation (Year: 2013).*
International Search Report dated Nov. 22, 2016 in PCT/JP2016/077012 filed Sep. 13, 2016.
Written Opinion (International Preliminary Report on Patentability) dated Mar. 20, 2018, in PCT/JP2016/077012 (5 pages).

* cited by examiner

*Primary Examiner* — Duc Truong
(74) *Attorney, Agent, or Firm* — Oblon, McClelland, Maier & Neustadt, L.L.P.

(57) ABSTRACT

The present invention provides the following: a photo alignment method-use liquid crystal aligning agent used to obtain a photo alignment method-use liquid crystal alignment film that does not cause bright spots even when negative liquid crystals are used, and that is capable of achieving good after-image characteristics; a liquid crystal alignment film obtained from the liquid crystal aligning agent; and a liquid crystal display element provided with the liquid crystal aligning agent. Provided is the liquid crystal aligning agent which contains a polyimide or polyimide precursor obtained from a reaction between: a tetracarboxylic acid dianhydride represented by formula (1) (in the formula, $X^1$ is as set forth in the present specification) or a derivative thereof; and a diamine component that contains a diamine represented by formula (2) (in the formula, $R^1$, $Z^1$ and n are as set forth in the present specification).

7 Claims, No Drawings

LIQUID CRYSTAL ALIGNING AGENT, LIQUID CRYSTAL ALIGNMENT FILM AND LIQUID CRYSTAL DISPLAY ELEMENT

TECHNICAL FIELD

The present invention relates to liquid crystal alignment agents, liquid crystal alignment films and liquid crystal display devices.

BACKGROUND ART

Liquid crystal display devices are currently used widely as displays in digital cameras, laptop computers, mobile terminals and the like. In general, liquid crystal display devices are constituted of members such as liquid crystals, liquid crystal alignment films, electrodes and substrates, and various driving systems are adopted in accordance with, for example, the applications in which they are used. For example, In Plane Switching (IPS) (registered trademark) using a horizontal electric field, and its advanced technology, Fringe-Field Switching (FFS), are adopted to realize a wide viewing angle of liquid crystal display devices.

Liquid crystal display devices show information by means of aligned liquid crystal molecules which are driven by voltage. Polyimide liquid crystal alignment films are used widely to serve as films on which liquid crystal molecules are aligned in a controlled manner (see, for example, Patent Literatures 1 and 2).

The ability to control the alignment of a liquid crystal is imparted by performing an alignment treatment on an organic film disposed on a substrate. The so-called rubbing method is a conventionally known liquid crystal alignment treatment in which an organic film is rubbed with cloth wrapped around a roller. The rubbing method has gained a wide use because of the advantage that a relatively stable alignment of liquid crystal can be realized easily. However, the rubbing method is often problematic in that the yield is lowered by the generation of dust and static electricity. Further, the alignment of a liquid crystal that is obtained is sometimes nonuniform on account of the fact that the cloth cannot apply a uniform rubbing on the surface of a liquid crystal alignment film because of the recent higher definition of liquid crystal display devices and the presence of irregularities which are created by the electrodes on the corresponding substrates and by the TFT elements for driving of the liquid crystal.

Photoalignment has been studied actively as an alignment treatment alternative to the rubbing of liquid crystal alignment films. Among numerous photoalignment methods, a common method is such that anisotropy is produced in an organic film that will form a liquid crystal alignment film by the application of linearly polarized light or collimated light and a liquid crystal is aligned along the anisotropy. A main photoalignment material is a polyimide that is decomposed by light. Unfortunately, liquid crystal alignment films obtained by the photoalignment method have a problem in that the anisotropy in the direction of alignment of the polymer film is smaller than that obtained by rubbing. Small anisotropy causes a failure to obtain sufficient alignment of a liquid crystal, and results in problems such as afterimages in liquid crystal display devices. To increase the anisotropy of a photoaligned liquid crystal alignment film, it has been proposed that the application of light is followed by the removal of low-molecular components that have arisen from the breakage of the main chains of the polyimide by the irradiation.

CITATION LIST

Patent Literature

Patent Literature 1: JP H10-123532 A
Patent Literature 2: WO 2004/053583

SUMMARY OF INVENTION

Technical Problem

While conventionally, positive liquid crystals are adopted for IPS or FFS liquid crystal display devices, the use of negative liquid crystals makes it possible to reduce the transmission loss at above electrodes and to enhance contrast. When a liquid crystal alignment film obtained by the photoalignment method is used in an IPS or FFS liquid crystal display device having a negative liquid crystal, the resultant liquid crystal display device is expected to attain a higher display performance than the conventional one. However, studies by the present inventors have shown that when a liquid crystal display device is fabricated using a so-called photodecomposed liquid crystal alignment film which has attained anisotropy by the light-induced decomposition of a polymer, and a negative liquid crystal aligned therewith, display defects (bright spots) occur at a high frequency which are ascribed to the products resulting from the decomposition of the polymer in the liquid crystal alignment film by the application of polarized UV light. The objects of the present invention are therefore to provide a liquid crystal alignment agent for photoalignment which can form a photoalignable or photoaligned liquid crystal alignment film that does not cause bright spots and offers good afterimage characteristics even in the case where a negative liquid crystal is used, and to provide a liquid crystal alignment film obtained from the liquid crystal alignment agent, and a liquid crystal display device including the liquid crystal alignment agent.

Solution to Problem

The present inventors have carried out extensive studies directed to achieving the above objects, and have completed the present invention as a result. A summary of the present invention is as described below.

[1] A liquid crystal alignment agent comprising a polyimide or polyimide precursor, the polyimide or polyimide precursor being obtained by reacting a tetracarboxylic dianhydride represented by the formula (1) below or a derivative thereof,

[Chemical Formula 1]

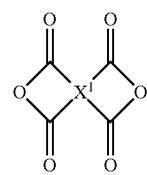

(1)

wherein X¹ is a tetravalent organic group, with a diamine component comprising a diamine represented by the formula (2) below:

[Chemical Formula 2]

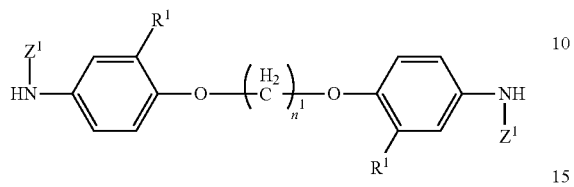
(2)

wherein

R¹ independently at each occurrence is a hydrogen atom, a methyl group or a fluorine atom, at least one R¹ is a methyl group or a fluorine atom;

Z¹ independently at each occurrence is a hydrogen atom or an optionally substituted C1-6 alkyl, C2-6 alkenyl or C2-6 aralkyl group; and n¹ is 1 or 2.

[2] The liquid crystal alignment agent according to [1], wherein the polyimide precursor comprises a structural unit represented by the formula (I) below:

[Chemical Formula 3]

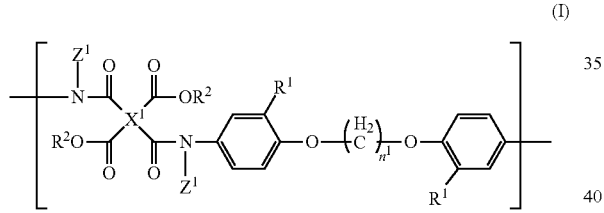
(I)

wherein

R¹ independently at each occurrence is a hydrogen atom, a methyl group or a fluorine atom, at least one R¹ is a methyl group or a fluorine atom;

R² independently at each occurrence is a hydrogen atom or a C1-6 alkyl group;

X¹ is a group selected from the group consisting of the formulae (X1-1) to (X1-9) below:

[Chemical Formula 4]

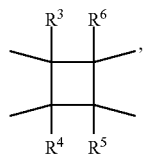
(X1-1)

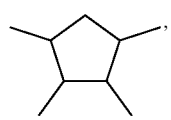
(X1-2)

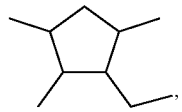
(X1-3)

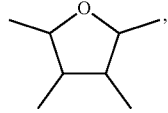
(X1-4)

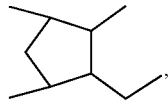
(X1-5)

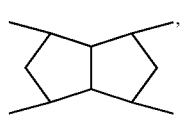
(X1-6)

(X1-7)

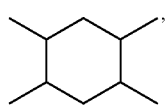
, and (X1-8)

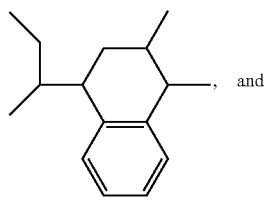
(X1-9)

wherein $R^3$, $R^4$, $R^5$ and $R^6$ are each independently a hydrogen atom, a halogen atom, a C1-6 alkyl group, a C2-6 alkenyl group, a C2-6 alkynyl group or a phenyl group;

Z¹ independently at each occurrence is a hydrogen atom or an optionally substituted C1-6 alkyl, C2-6 alkenyl or C2-6 aralkyl group; and n¹ is 1 or 2.

[3] The liquid crystal alignment agent according to [1] or [2], wherein X¹ is a group represented by the formula (X1-1) below:

[Chemical Formula 5]

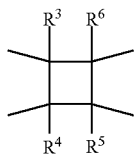
(X1-1)

wherein $R^3$, $R^4$, $R^5$ and $R^6$ are each independently a hydrogen atom, a halogen atom, a C1-6 alkyl group, a C2-6 alkenyl group, a C2-6 alkynyl group or a phenyl group.

[4] The liquid crystal alignment agent according to [2] or [3], wherein the polyimide precursor comprises the structural units of the formula (I) in a proportion of not less than 20% by mole relative to the total structural units.

[5] A liquid crystal alignment film obtained using the liquid crystal alignment agent according to any one of [1] to [4].

[6] A liquid crystal alignment film obtained by applying the liquid crystal alignment agent according to any one of [1] to [4] onto a substrate and subjecting the agent-applied substrate to photoalignment.

[7] A liquid crystal display device comprising the liquid crystal alignment film according to [5] or [6].

Advantageous Effects of Invention

Use of the liquid crystal alignment agent of the present invention permits suppressing the occurrence of bright spots which are ascribed to products from the decomposition of a liquid crystal alignment film during the photoalignment treatment, exhibiting high illumination sensitivity and attaining a superior ability to align a liquid crystal. Thus, it becomes possible to provide liquid crystal displays which are free from display defects and are of high reliability.

DESCRIPTION OF EMBODIMENTS

The present invention will be described in detail below.
<<Liquid Crystal Alignment Agents>>
<Polyimides or Polyimide Precursors>

The liquid crystal alignment agent of the present invention contains a polyimide or polyimide precursor which contains a specific diamine-derived structural unit. In a specific embodiment, the liquid crystal alignment agent of the invention contains a polyimide or polyimide precursor that is obtained by reacting a tetracarboxylic dianhydride represented by the formula (1) below or a derivative thereof,

[Chemical Formula 6]

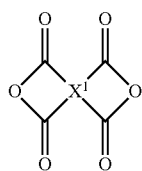
(1)

wherein $X^1$ is a tetravalent organic group, with a diamine component containing a diamine represented by the formula (2) below:

[Chemical Formula 7]

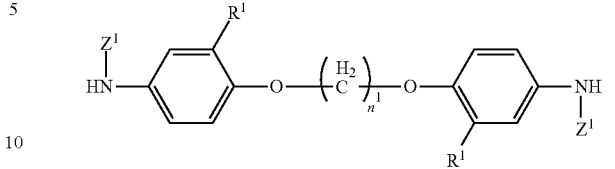
(2)

wherein
$R^1$ independently at each occurrence is a hydrogen atom, a methyl group or a fluorine atom, at least one $R^1$ is a methyl group or a fluorine atom;
$Z^1$ independently at each occurrence is a hydrogen atom or an optionally substituted C1-6 alkyl, C2-6 alkenyl or C2-6 aralkyl group; and
$n^1$ is 1 or 2.

In another specific embodiment, the liquid crystal alignment agent of the invention contains a polyimide precursor which contains a structural unit represented by the formula (I) below:

[Chemical Formula 8]

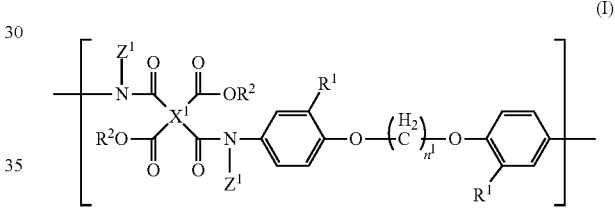
(I)

wherein
$R^1$ independently at each occurrence is a hydrogen atom, a methyl group or a fluorine atom, at least one $R^1$ is a methyl group or a fluorine atom;
$R^2$ independently at each occurrence is a hydrogen atom or a C1-6 alkyl group;
$X^1$ is a group selected from the group consisting of the formulae (X1-1) to (X1-9) below:

[Chemical Formula 9]

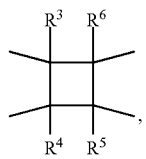
(X1-1)

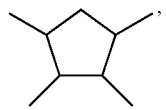
(X1-2)

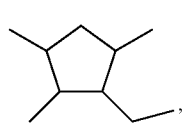
(X1-3)

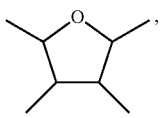
(X1-4)

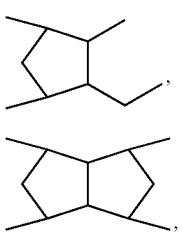
(X1-5)

(X1-6)

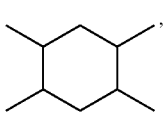
(X1-7)

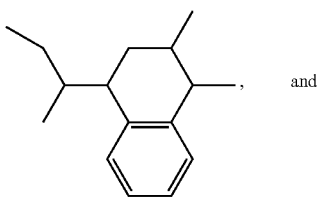
(X1-8)
and

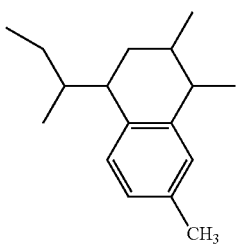
(X1-9)

wherein $R^3$, $R^4$, $R^5$ and $R^6$ are each independently a hydrogen atom, a halogen atom, a C1-6 alkyl group, a C2-6 alkenyl group, a C2-6 alkynyl group or a phenyl group;

$Z^1$ independently at each occurrence is a hydrogen atom or an optionally substituted C1-6 alkyl, C2-6 alkenyl or C2-6 aralkyl group; and $n^1$ is 1 or 2.

(Tetracarboxylic Dianhydride Components)

The tetracarboxylic dianhydride component in the polyimide or polyimide precursor of the present invention is a tetracarboxylic dianhydride represented by the formula (1) below or a derivative thereof:

[Chemical Formula 10]

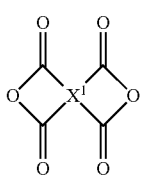
(1)

wherein $X^1$ is a tetravalent organic group. Here, the derivative of the tetracarboxylic dianhydride refers to the tetracarboxylic acid resulting from the ring opening of the dianhydride, or a diester thereof in the form of, for example, a dihalide. For example, such a derivative is represented by the following formula (1'):

[Chemical Formula 11]

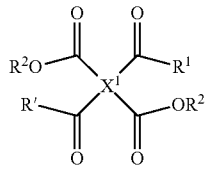
(1')

wherein $X^1$ is a tetravalent organic group, R' is a halogen atom or a hydroxyl group, and $R^2$ is a hydrogen atom or a C1-6 alkyl group.

Examples of the tetravalent organic groups (i.e., $X^1$) include those derived from aromatic compounds having 6 to 20 carbon atoms (such as, for example, benzene, indene, naphthalene and fluorene) or partially saturated compounds thereof (such as, for example, tetralin), tetravalent groups derived from aliphatic compounds having 2 to 20 carbon atoms (such as, for example, butane, cyclobutane, cyclopentane, cyclohexane, bicyclooctane and tetrahydrofuran), and those derived from compounds formed by the linking of two or more molecules of the aforementioned compounds, which may be the same as or different from one another (such as, for example, biphenyl, cyclohexylbenzene, diphenyl ether, benzophenone and diphenylmethane), by direct bonding or via a bridging group (the bridging group being selected from, for example, —O—, —CO—, —COO—, —OCO—, —$SO_2$—, —S—, —$CH_2$—, —$C(CH_3)_2$— and —$C(CF_3)_2$—). The above compounds may have one or more substituents selected from C1-6 alkyl groups, C2-6 alkenyl groups, C2-6 alkynyl groups, C1-6 alkoxy groups and halogen atoms.

As used herein, the term "C1-6 alkyl groups" means monovalent groups derived from linear, branched or cyclic aliphatic saturated hydrocarbons having 1 to 6 carbon atoms. Specific examples thereof include methyl group, ethyl group, propyl group, butyl group, t-butyl group, hexyl group, cyclopentyl group, cyclohexyl group and bicyclohexyl group.

The term "C2-6 alkenyl groups" means monovalent groups derived from linear, branched or cyclic aliphatic unsaturated hydrocarbons with 2 to 6 carbon atoms which have one or more carbon-carbon double bonds. Specific examples thereof include vinyl group, allyl group, 1-propenyl group, isopropenyl group, 2-butenyl group, 1,3-butadienyl group, 2-pentenyl group, 2-hexenyl group, cyclopropenyl group, cyclopentenyl group and cyclohexenyl group.

The term "C2-6 alkynyl groups" means monovalent groups derived from linear, branched or cyclic aliphatic unsaturated hydrocarbons with 2 to 6 carbon atoms which have one or more carbon-carbon triple bonds. Specific examples thereof include ethynyl group, 1-propynyl group and 2-propynyl group.

The term "C1-6 alkoxy groups" means groups —OR (wherein R is the C1-6 alkyl group described above). Specific examples thereof include methoxy group, ethoxy group, propoxy group, butoxy group, t-butoxy group, hexyloxy group, cyclopentyloxy group and cyclohexyloxy group.

The substituents in the "optionally substituted C1-6 alkyl, C2-6 alkenyl or C2-6 aralkyl groups" are not particularly limited as long as the properties of the liquid crystal alignment agent of the invention are not impaired. Examples thereof include halogen atoms, hydroxyl groups, thiol groups, nitro groups, organooxy groups, organothio groups, organosilyl groups, acyl groups, ester groups, thioester groups, phosphate groups, amide groups, aryl groups, alkyl groups, alkenyl groups and alkynyl groups.

The term "halogen atoms" means fluorine atoms, chlorine atoms, bromine atoms or iodine atoms.

Examples of the tetracarboxylic dianhydride components represented by the formula (1) include 1,2,3,4-butanetetracarboxylic dianhydride, 1,2,3,4-cyclobutanetetracarboxylic dianhydride, 1,3-dimethyl-1,2,3,4-cyclobutanetetracarboxylic dianhydride, 1,2-dimethyl-1,2,3,4-cyclobutanetetracarboxylic dianhydride, 1,2,3-trimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 2,3,4,5-tetrahydrofurantetracarboxylic dianhydride, 2,4,5-tricarboxycyclopentylacetic dianhydride, bicyclo[3,3,0]octane-2,4,6,8-tetracarboxylic dianhydride, 1,2,4,5-cyclohexanetetracarboxylic dianhydride, 3,4-dicarboxy-1-cyclohexylsuccinic dianhydride, 3,4-dicarboxy-1,2,3,4-tetrahydro-1-naphthalenesuccinic dianhydride, 3,4-dicarboxy-6-methyl-1,2,3,4-tetrahydro-1-naphthalenesuccinic dianhydride, pyromellitic dianhydride, 3,3',4,4'-biphenyltetracarboxylic dianhydride, 2,2',3,3'-biphenyltetracarboxylic dianhydride, 2,3,3',4'-biphenyltetracarboxylic dianhydride, 3,3',4,4'-benzophenonetetracarboxylic dianhydride, 2,3,3',4'-benzophenonetetracarboxylic dianhydride, bis(3,4-dicarboxyphenyl)ether dianhydride, bis(3,4-dicarboxyphenyl)sulfone dianhydride, 1,2,5,6-naphthalenetetracarboxylic dianhydride, 2,3,6,7-naphthalenetetracarboxylic dianhydride and 1,4,5,8-naphthalenetetracarboxylic dianhydride.

It is preferable to use at least one tetracarboxylic dianhydride, or derivative thereof, selected from the group consisting of 1,2,3,4-cyclobutanetetracarboxylic dianhydride, 1,3-dimethyl-1,2,3,4-cyclobutanetetracarboxylic dianhydride, 1,2-dimethyl-1,2,3,4-cyclobutanetetracarboxylic dianhydride, 1,2,3-trimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 2,3,4,5-tetrahydrofurantetracarboxylic dianhydride, 2,4,5-tricarboxycyclopentylacetic dianhydride, bicyclo[3,3,0]octane-2,4,6,8-tetracarboxylic dianhydride, 1,2,4,5-cyclohexanetetracarboxylic dianhydride, 3,4-dicarboxy-1,2,3,4-tetrahydro-1-naphthalenesuccinic dianhydride and 3,4-dicarboxy-6-methyl-1,2,3,4-tetrahydro-1-naphthalenesuccinic dianhydride. It is particularly preferable to use 1,2,3,4-cyclobutanetetracarboxylic dianhydride, 1,3-dimethyl-1,2,3,4-cyclobutanetetracarboxylic dianhydride, or a derivative thereof. These tetracarboxylic dianhydrides or derivatives thereof are commercially available, can be produced by methods described in known literature, or can be produced by methods known to the skilled artisan.

Thus, the tetravalent organic group (i.e., $X^1$) in a preferred embodiment is a group selected from the group consisting of the formulae (X1-1) to (X1-9) below:

[Chemical Formula 12]

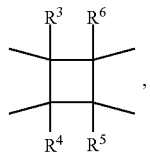   (X1-1)

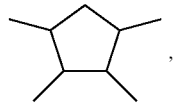   (X1-2)

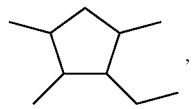   (X1-3)

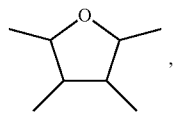   (X1-4)

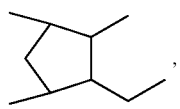   (X1-5)

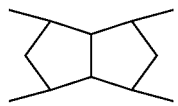   (X1-6)

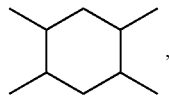   (X1-7)

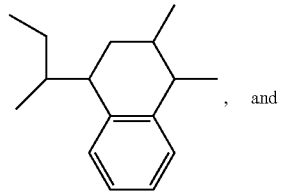   , and   (X1-8)

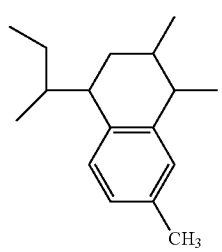   (X1-9)

wherein $R^3$, $R^4$, $R^5$ and $R^6$ are each independently a hydrogen atom, a halogen atom, a C1-6 alkyl group, a C2-6 alkenyl group, a C2-6 alkynyl group or a phenyl group. In a more preferred embodiment, $X^1$ is a group represented by the formula (X1-1) below:

[Chemical Formula 13]

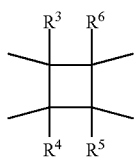

(X1-1)

wherein $R^3$, $R^4$, $R^5$ and $R^6$ are the same as defined above. In a particularly preferred embodiment, $X^1$ is a group represented by the formula (X1-1) in which $R^3$, $R^4$, $R^5$ and $R^6$ are each independently a hydrogen atom or a C1-6 alkyl group.

For the polyimide or polyimide precursor of the present invention, one or two or more kinds of the tetracarboxylic dianhydrides represented by the formula (1) and derivatives thereof may be used.

(Diamine Components)

The diamine component in the polyimide or polyimide precursor of the present invention is characterized by containing a diamine represented by the formula (2) below:

[Chemical Formula 14]

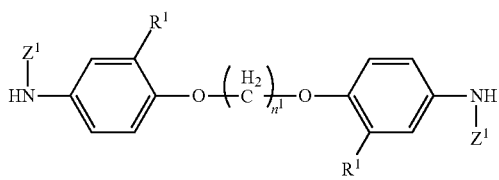

(2)

wherein $R^1$ independently at each occurrence is a hydrogen atom, a methyl group or a fluorine atom, at least one $R^1$ is a methyl group or a fluorine atom;

$Z^1$ independently at each occurrence is a hydrogen atom or an optionally substituted C1-6 alkyl, C2-6 alkenyl or C2-6 aralkyl group; and $n^1$ is 1 or 2. In a preferred embodiment, $Z^1$ independently at each occurrence is a hydrogen atom or a C1-6 alkyl group.

Examples of the diamine represented by the formula (2) include bis(4-amino-2-methylphenoxy)methane, bis(4-amino-2-fluorophenoxy)methane, 4-[2-(4-amino-2-fluorophenyl)methoxy]aniline, 4-[2-(4-amino-2-methylphenyl)methoxy]aniline, 1,2-bis(4-amino-2-methylphenoxy)ethane, 1,2-bis(4-amino-2-fluorophenoxy)ethane, 4-[2-(4-amino-2-fluorophenyl)ethoxy]aniline and 4-[2-(4-amino-2-methylphenyl)ethoxy]aniline. These diamines are commercially available, can be produced by methods described in known literature, or can be produced by the method described in Synthetic Examples of the present specification.

For the polyimide or polyimide precursor of the present invention, one or two or more kinds of the diamines represented by the formula (2) may be used.

In the total diamine components used, the proportion of the diamine represented by the formula (2) is preferably not less than 20% by mole, more preferably 50 to 100% by mole, still more preferably 70 to 100% by mole, and particularly preferably 85 to 100% by mole.

Thus, of the total structural units in the liquid crystal alignment agent of the invention, the proportion of the structural units represented by the formula (I) is preferably not less than 20% by mole, more preferably 50 to 100% by mole, still more preferably 70 to 100% by mole, and particularly preferably 85 to 100% by mole.

The diamine component in the polyimide or polyimide precursor of the invention may include one or more diamines other than the diamines represented by the formula (2). Such diamines are not particularly limited as long as the properties of the liquid crystal alignment agent of the invention are not impaired, but typically they are those diamines represented by the formula (3) below:

[Chemical Formula 15]

(3)

wherein

Y is a divalent organic group; and $Z^2$ independently at each occurrence is a hydrogen atom or an optionally substituted C1-6 alkyl, C2-6 alkenyl or C2-6 aralkyl group.

Examples of the divalent organic groups (i.e., Y) include divalent groups derived from aromatic compounds having 6 to 20 carbon atoms (such as, for example, benzene, indene, naphthalene, fluorene, furan and pyrrole) or partially saturated compounds thereof (such as, for example, tetralin), divalent groups derived from aliphatic compounds having 2 to 20 carbon atom (such as, for example, ethane, butane, cyclobutane, cyclopentane, cyclohexane, bicyclooctane and tetrahydrofuran), and those derived from compounds formed by the linking of two or more molecules of the aforementioned compounds, which may be the same as or different from one another (such as, for example, biphenyl, cyclohexylbenzene, diphenyl ether, benzophenone and diphenylmethane), by direct bonding or via a bridging group (the bridging group being, for example, —O—, —CO—, —COO—, —OCO—, —SO$_2$—, —S—, —CH$_2$—, —C(CH$_3$)$_2$— or —C(CF$_3$)$_2$—). The above compounds may have one or more substituents selected from C1-6 alkyl groups, C2-6 alkenyl groups, C2-6 alkynyl groups, C1-6 alkoxy groups and halogen atoms.

Of the diamine components for the polyimide or polyimide precursor of the present invention, examples of the diamines represented by the formula (3) include those diamines in which Y is a group selected from the group consisting of the following formulae (Y-1) to (Y-49) and (Y-57) to (Y-118):

[Chemical Formula 16]

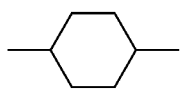        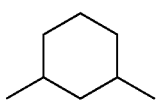

(Y-1)       (Y-2)

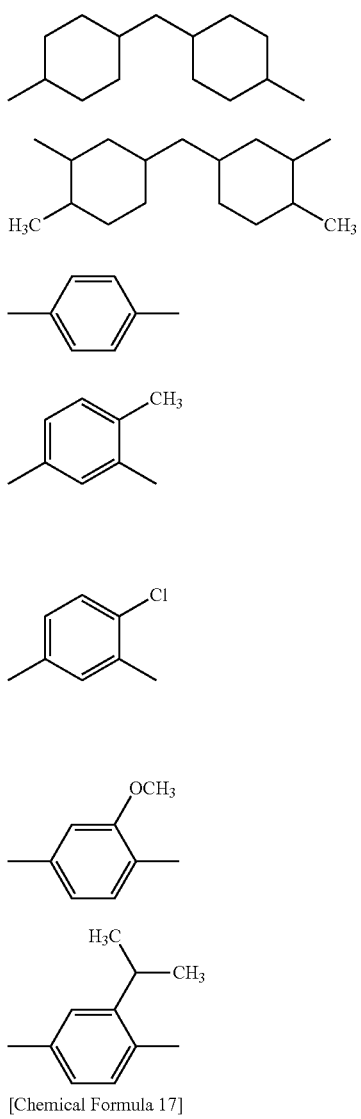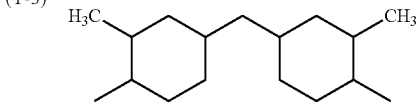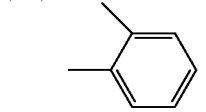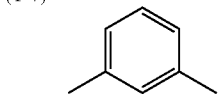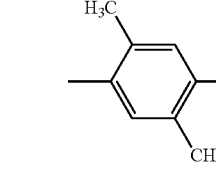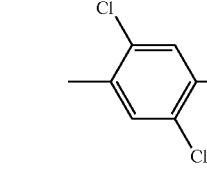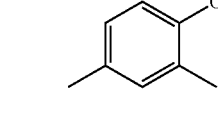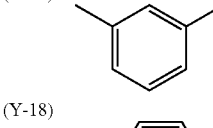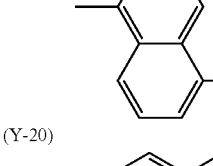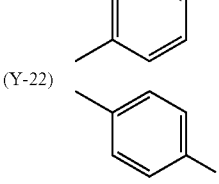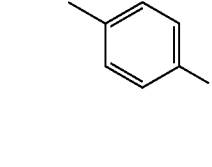

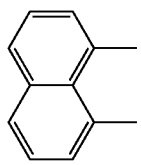
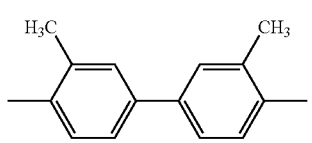
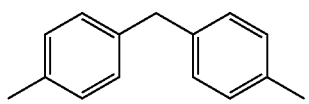
[Chemical Formula 18]
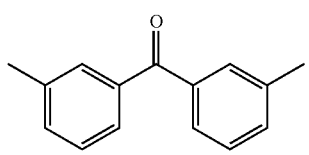
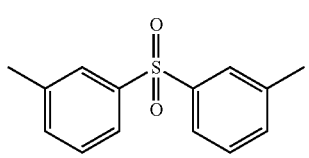
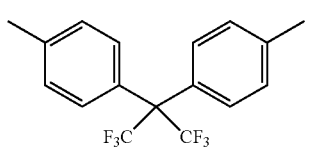
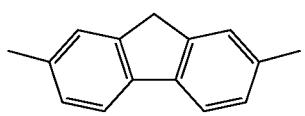
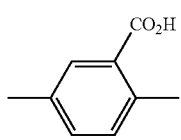
[Chemical Formula 19]
n = 2~5
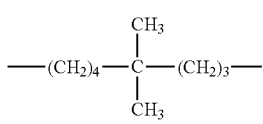
-continued
(Y-24)
(Y-25)
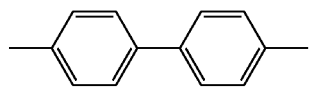
(Y-26)
(Y-27)
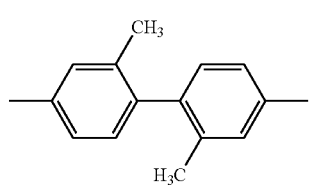
(Y-28)
(Y-29)
(Y-30)
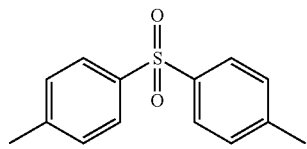
(Y-31)
(Y-32)
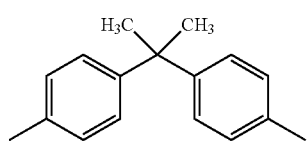
(Y-33)
(Y-34)
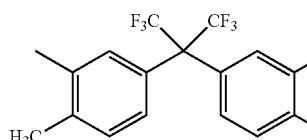
(Y-35)
(Y-36)
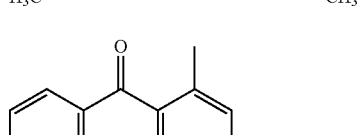
(Y-37)
(Y-38)
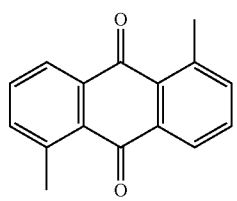
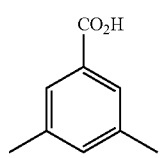
(Y-39)
(Y-40)
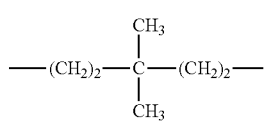
(Y-41)
(Y-42)
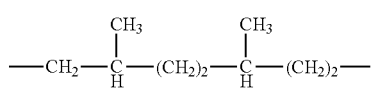

-continued
[Chemical Formula 20]
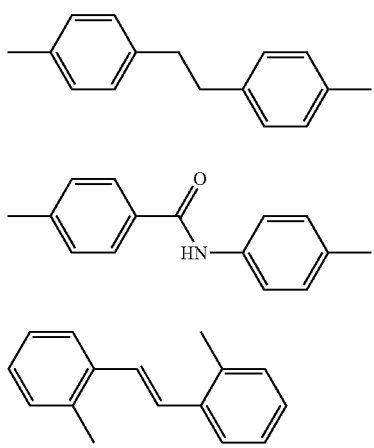
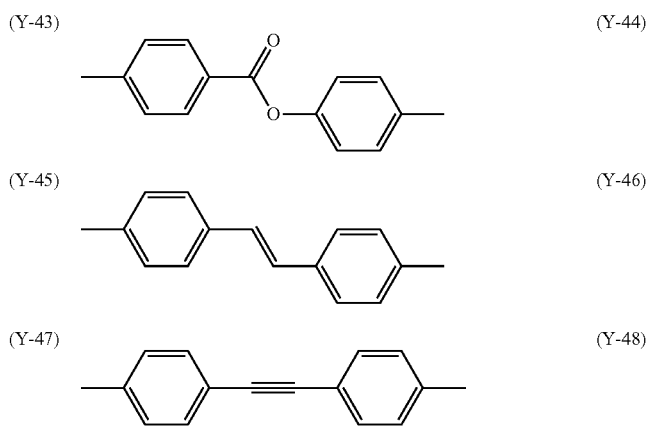
[Chemical Formula 21]
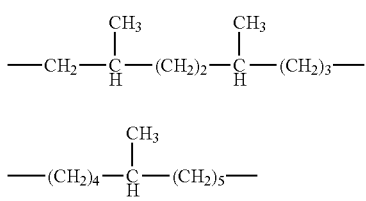
[Chemical Formula 22]
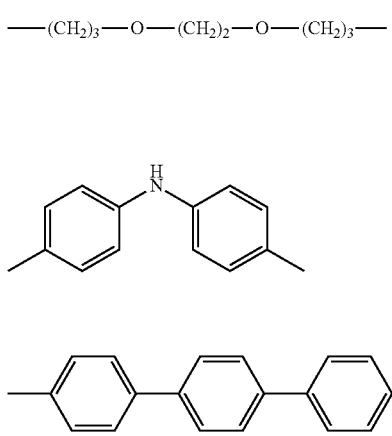
[Chemical Formula 23]
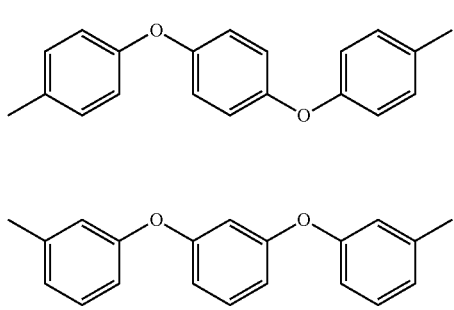

-continued
(Y-68)
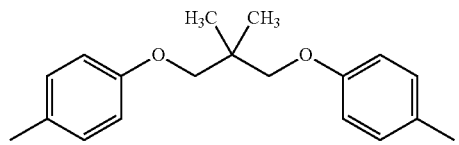
(Y-69)
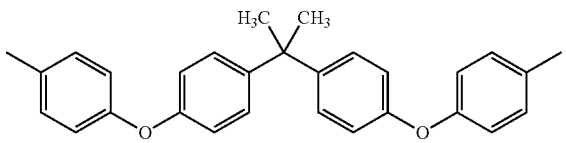
(Y-70)
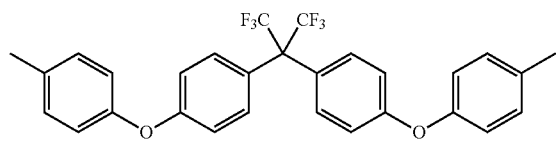
(Y-71)
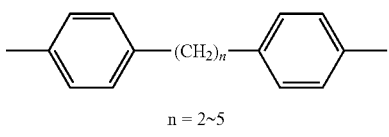
n = 2~5
(Y-72)
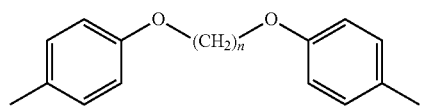
n = 3~5
[Chemical Formula 24]
(Y-73)
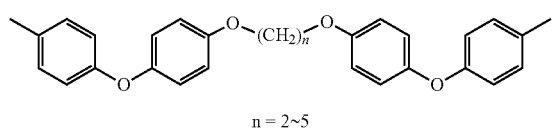
n = 2~5
(Y-74)
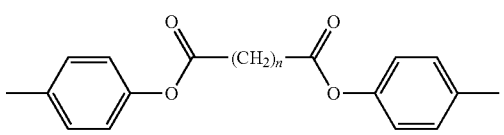
n = 2~5
(Y-75)
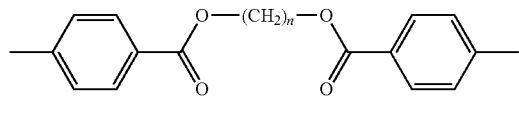
n = 2~5
(Y-76)
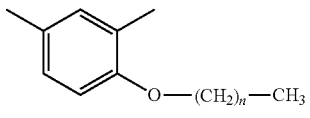
n = 5~19
(Y-77)
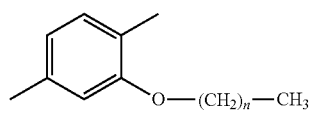
n = 5~19
[Chemical Formula 25]
(Y-78)
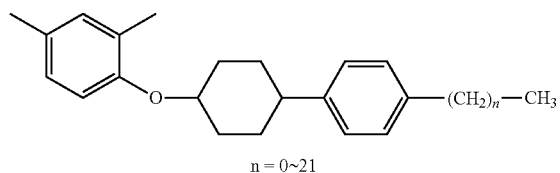
n = 0~21
(Y-79)
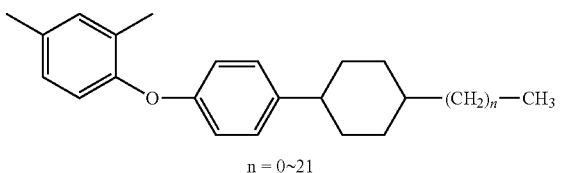
n = 0~21
(Y-80)
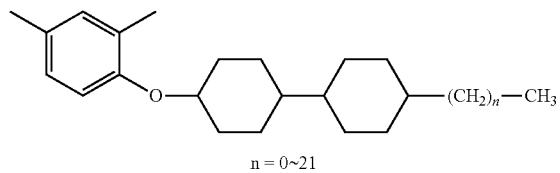
n = 0~21
(Y-81)
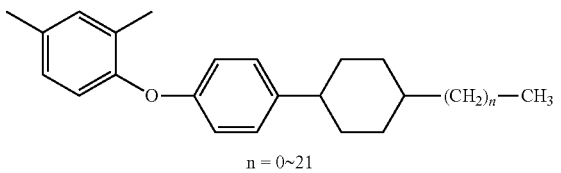
n = 0~21

(Y-82) 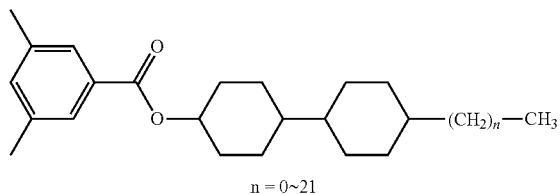
n = 0~21
(Y-83) 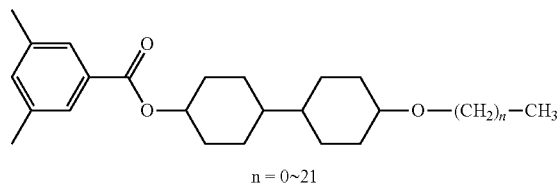
n = 0~21
[Chemical Formula 26]
(Y-84) 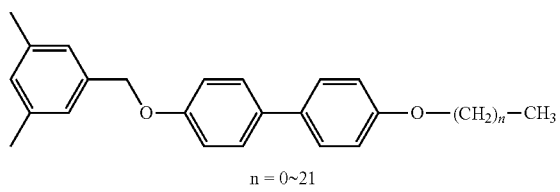
n = 0~21
(Y-85) 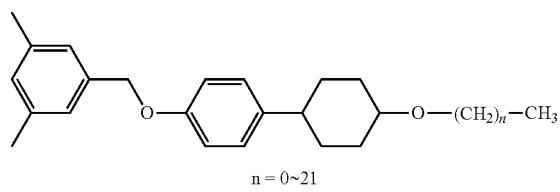
n = 0~21
(Y-86) 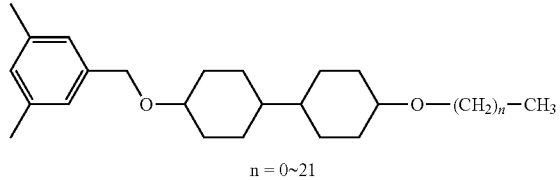
n = 0~21
(Y-87) 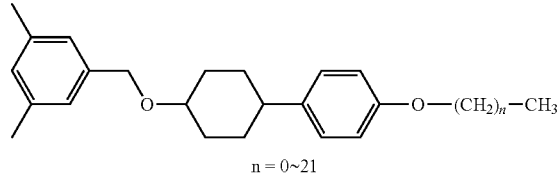
n = 0~21
[Chemical Formula 27]
(Y-88) 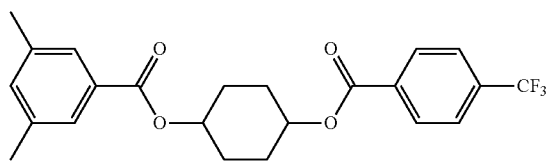
(Y-89) 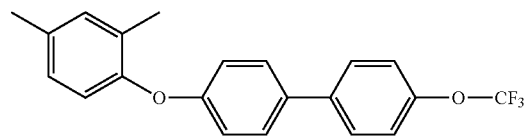
(Y-90) 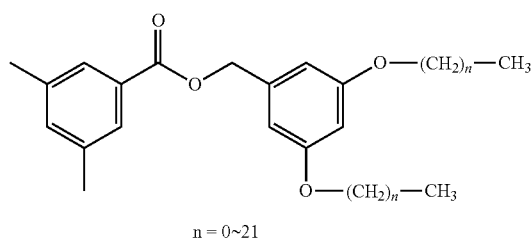
n = 0~21
(Y-91) 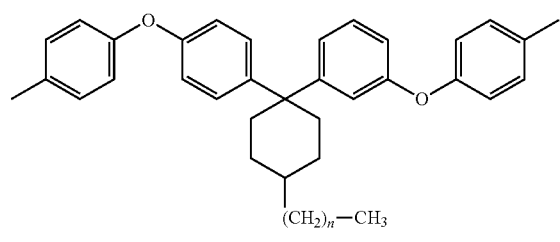
n = 0~21
(Y-92) 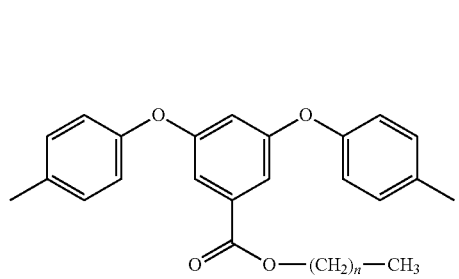
n = 0~21
(Y-93) 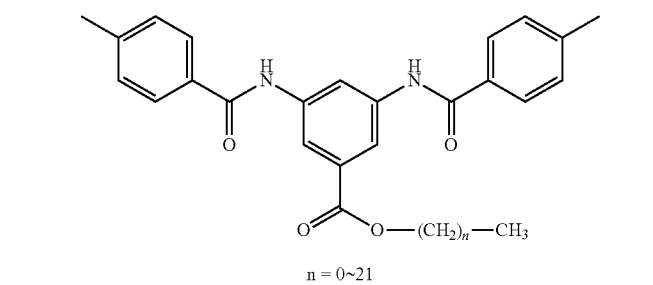
n = 0~21

[Chemical Formula 28]
(Y-94)
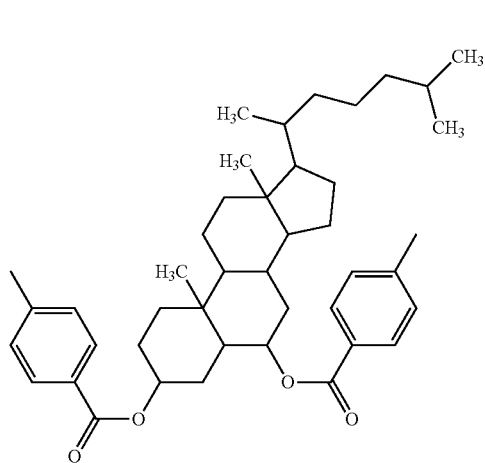
(Y-95)
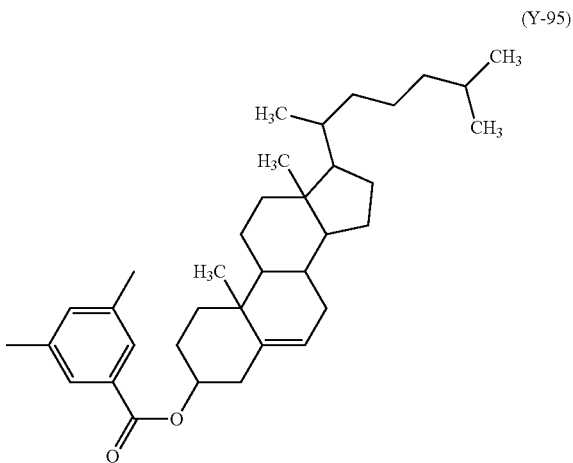
(Y-96)
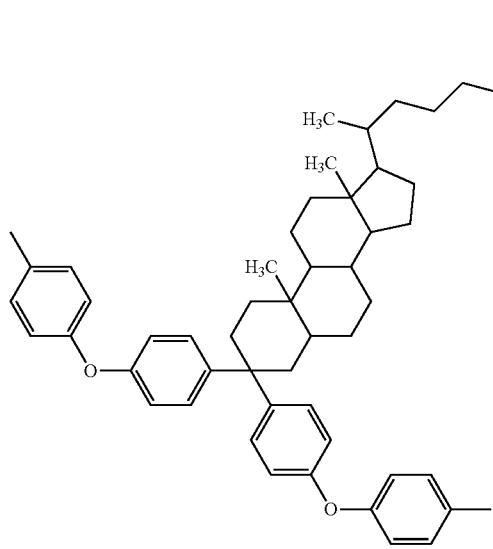
(Y-97)
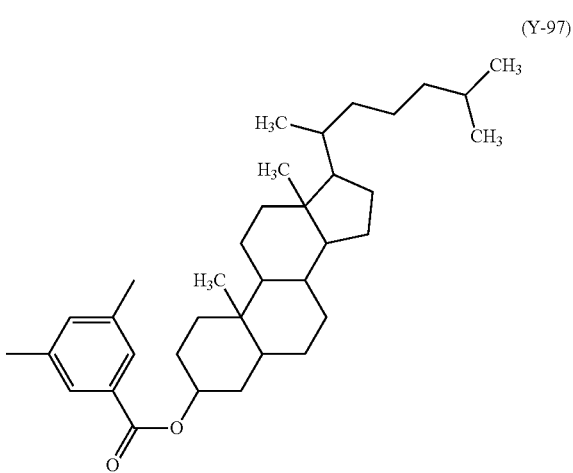
[Chemical Formula 29]
(Y-98)
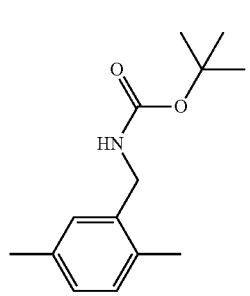
(Y-99)
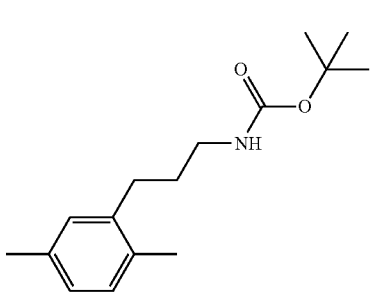
(Y-100)
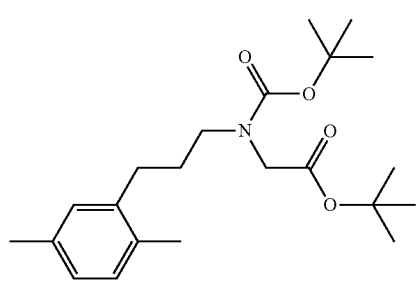

[Chemical Formula 30]
(Y-101) 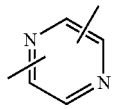
(Y-102) 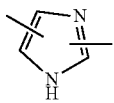
(Y-103) 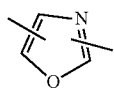
(Y-104) 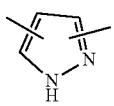
(Y-105) 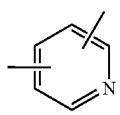
(Y-106) 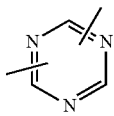
(Y-107) 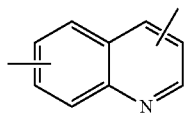
(Y-108) 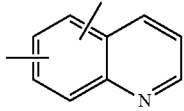
[Chemical Formula 31]
(Y-109) 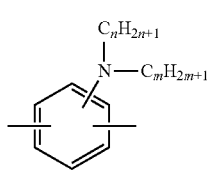
(Y-110) 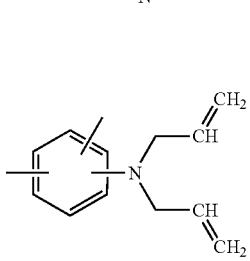
(Y-111)
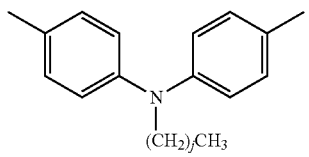
(Y-112)
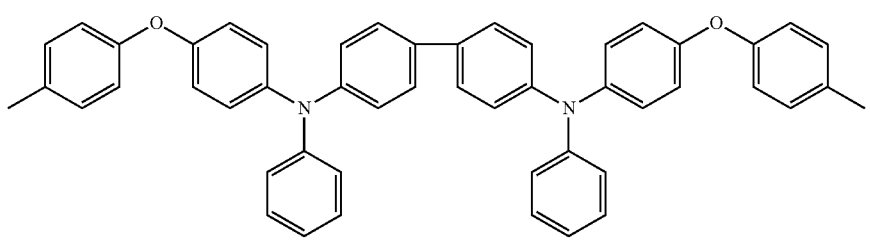
(Y-113) 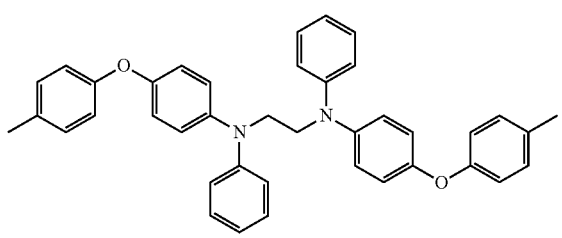
(Y-114) 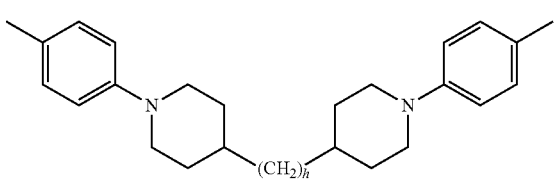

In the formula (Y-109), m and n are each independently an integer of 1 to 11, and m+n is an integer of 2 to 12. In the formula (Y-111), j is an integer of 0 to 3. In the formula (Y-114), h is an integer of 1 to 3.

[Chemical Formula 32]

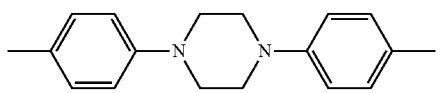
(Y-115)

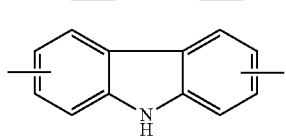
(Y-116)

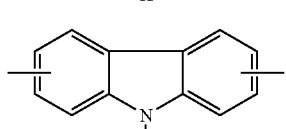
(Y-117)

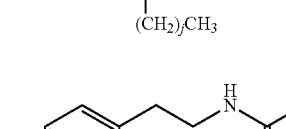
(Y-118)

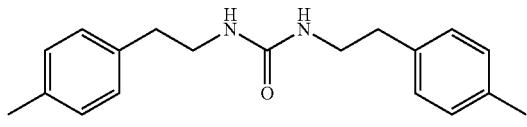

In the formulae (Y-111) and (Y-117), j is an integer of 0 to 3.

These diamines are commercially available, can be produced by methods described in known literature, or can be produced by methods known to the skilled artisan.

(Production Methods)
1) Production of Polyimide Precursor—Polyamic Acid

A polyamic acid that is a polyimide precursor in the present invention is produced by the following method.

Specifically, the polyamic acid may be synthesized by reacting a tetracarboxylic dianhydride and a diamine in the presence of an organic solvent at −20° C. to 150° C., preferably 0° C. to 50° C., for 30 minutes to 24 hours, preferably 1 to 12 hours.

The reaction between the diamine component and the tetracarboxylic component is usually performed in an organic solvent. The organic solvent used here is not particularly limited as long as it can dissolve the polyimide precursor that is formed. Specific examples of the organic solvents used in the reaction include, but are not limited thereto, N-methyl-2-pyrrolidone, N-ethyl-2-pyrrolidone, or γ-butyrolactone, N,N-dimethyiformamide, N,N-dimethylacetamide, dimethyl sulfoxide, or 1,3-dimethyl-imidazolidinone.

When the solubility of the polyimide precursor is high, methyl ethyl ketone, cyclohexanone, cyclopentanone, 4-hydroxy-4-methyl-2-pentanone or an organic solvent represented by any of the following formulae [D-1] to [D-3] may be used.

[Chemical Formula 33]

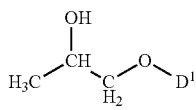
[D-1]

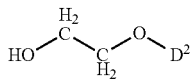
[D-2]

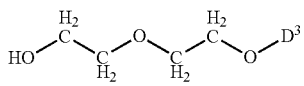
[D-3]

In the formula [D-1], $D^1$ is a C1-3 alkyl group. In the formula [D-2], $D^2$ is a C1-3 alkyl group. In the formula [D-3], $D^3$ is a C1-4 alkyl group.

The solvents may be used alone or in mixture thereof. Even a solvent that does not dissolve the polyimide precursor may be mixed with the solvent described above as long as the resultant polyimide precursor is not precipitated. Because water in the solvent would inhibit the polymerization reaction and cause the hydrolysis of the resultant polyimide precursor, it is preferable that the solvent be dehydrated and dried before use.

For the reasons that the precipitation of the polymer is unlikely to occur and that the polymer will attain a high molecular weight, the concentration of the polyamic acid in the reaction system ranges preferably 1 to 30% by mass, and more preferably 5 to 20% by mass.

After the polyamic acid has been formed as described above, the polymer may be precipitated and recovered by pouring the reaction solution into a poor solvent while performing sufficient stirring. A powder of the purified polyamic acid may be obtained by performing the precipitation operation several times, washing the precipitate with a poor solvent and drying it at room temperature or at elevated temperatures. Examples of the poor solvents include, but are not limited thereto, water, methanol, ethanol, hexane, butylcellosolve, acetone and toluene.

2) Production of Polyimide Precursor—Polyamic Acid Ester

A polyamic acid ester that is a polyimide precursor used in the present invention may be produced by the following method (i), (ii) or (iii).

(i) Production from Polyamic Acid

The polyamic acid ester may be produced by esterifying a polyamic acid produced as described above. Specifically, the ester may be produced by reacting a polyamic acid and an esterifying agent in the presence of an organic solvent at −20° C. to 150° C., preferably 0° C. to 50° C., for 30 minutes to 24 hours, preferably 1 to 4 hours.

The esterifying agent is preferably one which can be removed easily by purification, with examples including N,N-dimethylformamidodimethylacetal, N,N-dimethylformamidodiethylacetal, N,N-dimethylformamidodipropylacetal, N,N-dimethylformamidodineopentylbutylacetal, N,N-dimethylformamidodi-t-butylacetal, 1-methyl-3-p-tolyltriazene, 1-ethyl-3-p-tolyltriazene, 1-propyl-3-p-tolyltriazene and 4-(4,6-dimethoxy-1,3,5-triazin-2-yl)-4-methylmorpholinium chloride. The esterifying agent is preferably added in 2 to 6 molar equivalents with respect to 1 mol of the repeating units of the polyamic acid.

Examples of the organic solvents include N-methyl-2-pyrrolidone, N-ethyl-2-pyrrolidone, or γ-butyrolactone, N,N-dimethylformamide, N,N-dimethylacetamide, dimethyl sulfoxide, or 1,3-dimethyl-imidazolidinone. When the polyimide precursor has high solubility with respect to solvents, methyl ethyl ketone, cyclohexanone, cyclopentanone, 4-hydroxy-4-methyl-2-pentanone or a solvent represented by any of the aforementioned formulae [D-1] to [D-3] may be used.

The solvents may be used alone or in mixture thereof. Even a solvent that does not dissolve the polyimide precursor may be mixed with the solvent described above as long as the resultant polyimide precursor is not precipitated. Because water in the solvent would inhibit the polymerization reaction and cause the hydrolysis of the resultant polyimide precursor, it is preferable that the solvent be dehydrated and dried before use.

From the point of view of polymer's solubility, the solvent used in the reaction is preferably N,N-dimethylformamide, N-methyl-2-pyrrolidone or γ-butyrolactone; these solvents may be used alone, or two or more may be used in combination. For the reasons that the precipitation of the polymer is unlikely to occur and that the polymer will attain a high molecular weight, the concentration during the production ranges preferably 1 to 30% by mass, and more preferably 5 to 20% by mass.

(ii) Production by Reaction of Tetracarboxylic Acid Diester Dichloride and Diamine The polyamic acid ester may be produced from a tetracarboxylic acid diester dichloride and a diamine. Specifically, the ester may be produced by reacting a tetracarboxylic acid diester dichloride and a diamine in the presence of a base and an organic solvent at −20° C. to 150° C., preferably 0° C. to 50° C., for 30 minutes to 24 hours, preferably 1 to 4 hours.

Examples of the bases include pyridine, triethylamine and 4-dimethylaminopyridine. Pyridine is preferable because the reaction is mild. For the reasons that the removal of the base is easy and that the polymer will attain a high molecular weight, the amount in which the base is added is preferably 2 to 4 molar times the amount of the tetracarboxylic acid diester dichloride.

From the point of view of the solubility of the monomers and the polymer, the solvent used in the reaction is preferably N-methyl-2-pyrrolidone or γ-butyrolactone; these solvents may be used alone, or two or more may be used in combination. For the reasons that the precipitation of the polymer is unlikely to occur and that the polymer will attain a high molecular weight, the polymer concentration during the production ranges preferably 1 to 30% by mass, and more preferably 5 to 20% by mass. To prevent the tetracarboxylic acid diester dichloride from hydrolysis, the solvent used in the production of the polyamic acid ester is preferably dehydrated as much as possible, and it is preferable to perform the reaction in a nitrogen atmosphere while preventing an entry of outside air.

(iii) Production from Tetracarboxylic Acid Diester and Diamine

The polyamic acid ester may be produced by the polycondensation of a tetracarboxylic acid diester and a diamine. Specifically, the ester may be produced by reacting a tetracarboxylic acid diester and a diamine in the presence of a condensing agent, a base and an organic solvent at 0° C. to 150° C., preferably 0° C. to 100° C., for 30 minutes to 24 hours, preferably 3 to 15 hours.

Examples of the condensing agents include triphenyl phosphite, dicyclohexylcarbodiimide, 1-ethyl-3-(3-dimethylaminopropyl)carbodiimide hydrochloride salt, N,N'-carbonyldiimidazole, dimethoxy-1,3,5-triazinylmethylmorpholinium, O-(benzotriazol-1-yl)-N,N,N',N'-tetramethyluronium tetrafluoroborate, O-(benzotriazol-1-yl)-N,N,N',N'-tetramethyluronium hexafluorophosphate and diphenyl (2,3-dihydro-2-thioxo-3-benzoxazolyl)phosphonate. The amount of the condensing agent is preferably 2 to 3 molar times the amount of the tetracarboxylic acid diester.

Examples of the bases include tertiary amines such as pyridine and triethylamine. For the reasons that the removal of the base is easy and that the polymer will attain a high molecular weight, the amount in which the base is added is preferably 2 to 4 molar times the amount of the diamine component.

The above reaction is allowed to take place efficiently by the addition of a Lewis acid as an additive. Some preferred Lewis acids are lithium halides such as lithium chloride and lithium bromide. The amount of the Lewis acid is preferably 0 to 1.0 molar time the amount of the diamine component.

Of the above three types of the polyamic acid ester production methods, the production method (i) or (ii) is particularly preferable because the polyamic acid ester obtained attains a higher molecular weight.

The polymer may be precipitated by pouring the solution of the polyamic acid ester obtained as described above, into a poor solvent while performing sufficient stirring. A powder of the purified polyamic acid ester may be obtained by performing the precipitation operation several times, washing the precipitate with a poor solvent and drying it at room temperature or at elevated temperatures. Examples of the poor solvents include, but are not limited thereto, water, methanol, ethanol, hexane, butylcellosolve, acetone and toluene.

3. Production of Polyimides

The polyimide used in the invention may be produced by imidizing the above-described polyamic acid ester or polyamic acid.

For the production of the polyimide from the polyamic acid ester, chemical imidization in which a basic catalyst is added to the polyamic acid ester solution or to a polyamic acid solution of the polyamic acid ester resin powder in an organic solvent is simple and convenient. This chemical imidization is advantageous in that the imidization reaction takes place at a relatively low temperature and the polymer is unlikely to decrease its molecular weight during the course of imidization.

The chemical imidization may be performed by stirring the polyamic acid ester to be imidized, in an organic solvent in the presence of a basic catalyst. The organic solvent may be any of the aforementioned solvents used for the polymerization reaction. Examples of the basic catalysts include pyridine, triethylamine, trimethylamine, tributylamine and trioctylamine. Of these, triethylamine is preferable because it has a sufficient basicity to let the reaction proceed.

The imidization reaction may be performed at a temperature of −20° C. to 140° C., preferably 0° C. to 100° C., for a reaction time of 1 to 100 hours. The amount of the basic catalyst is 0.5 to 30 molar times, and preferably 2 to 20 molar times the amount of the amic acid ester groups. The imidization ratio of the polymer obtained may be controlled by controlling the amount of the catalyst, the temperature and the reaction time. Because the catalyst added and the like remain in the solution after the imidization reaction, it is preferable to recover the resultant imidized polymer in the manner described later and redissolve it into an organic solvent to make the liquid crystal alignment agent of the invention.

For the production of the polyimide from the polyamic acid, chemical imidization in which a catalyst is added to the solution of the polyamic acid obtained by the reaction of the diamine component and the tetracarboxylic dianhydride is simple and convenient. This chemical imidization is advantageous in that the imidization reaction takes place at a relatively low temperature and the polymer is unlikely to decrease its molecular weight during the course of imidization.

The chemical imidization may be performed by stirring the polyamic acid to be imidized, in an organic solvent in the presence of a basic catalyst and an acid anhydride. As the organic solvent, any of the aforementioned solvents used for the polymerization reaction may be used. Examples of the basic catalysts include pyridine, triethylamine, trimethylamine, tributylamine and trioctylamine. Of these, pyridine is preferable because it has an appropriate basicity to let the reaction proceed. Examples of the acid anhydrides include acetic anhydride, trimellitic anhydride and pyromellitic anhydride. Of these, acetic anhydride is preferably used because the purification after the completion of the reaction is easy.

The imidization reaction may be performed at a temperature of −20° C. to 140° C., preferably 0° C. to 100° C., for a reaction time of 1 to 100 hours. The amount of the basic catalyst is 0.5 to 30 molar times, and preferably 2 to 20 molar times the amount of the amic acid groups. The amount of the acid anhydride is 1 to 50 molar times, and preferably 3 to 30 molar times the amount of the amic acid groups. The imidization ratio of the polymer obtained may be controlled by controlling the amount of the catalyst, the temperature and the reaction time.
Because the catalyst added and the like remain in the solution after the imidization reaction of the polyamic acid ester or of the polyamic acid, it is preferable to recover the resultant imidized polymer in the manner described later and redissolve it into an organic solvent to make the liquid crystal alignment agent of the invention.

After the polyimide has been formed as described above, the polymer may be precipitated by pouring the solution into a poor solvent while performing sufficient stirring. A powder of the purified polyimide may be obtained by performing the precipitation operation several times, washing the precipitate with a poor solvent and drying it at room temperature or at elevated temperatures.

Examples of the poor solvents include, but are not limited thereto, methanol, acetone, hexane, butylcellosolve, heptane, methyl ethyl ketone, methyl isobutyl ketone, ethanol, toluene and benzene.

<Preparation of Liquid Crystal Alignment Agents>

The liquid crystal alignment agent of the invention contains a polyimide or polyimide precursor containing specific diamine-derived structural units. The molecular weight of the polyimide or polyimide precursor ranges preferably 2,000 to 500,000 in weight average molecular weight, more preferably 5,000 to 300,000, and still more preferably 10,000 to 100,000. The number average molecular weight ranges preferably 1,000 to 250,000, more preferably 2,500 to 150,000, and still more preferably 5,000 to 50,000.

The concentration of the polymer in the liquid crystal alignment agent used in the invention may be changed appropriately in accordance with the design of the thickness of a film to be formed. The concentration is preferably not less than 1% by weight in order to form a film that is uniform and free from defects, and is preferably not more than 10% by weight from the point of view of the storage stability of the solution.

The organic solvent, contained in the liquid crystal alignment agent used in the invention, in which the polymer is dissolved (hereinafter, the solvent is also written as good solvent) is not particularly limited as long as the polymer is dissolved uniformly therein.

Examples thereof include N,N-dimethylformamide, N,N-dimethylacetamide, N-methyl-2-pyrrolidone, N-ethyl-2-pyrrolidone, dimethyl sulfoxide, γ-butyrolactone, 1,3-dimethyl-imidazolidinone, methyl ethyl ketone, cyclohexanone, cyclopentanone and 4-hydroxy-4-methyl-2-pentanone. Of these, N-methyl-2-pyrrolidone, N-ethyl-2-pyrrolidone and γ-butyrolactone are preferably used. When the polymer of the invention has high solubility with respect to solvents, it is preferable to use a solvent represented by any of the aforementioned formulae [D-1] to [D-3]. The good solvent in the liquid crystal alignment agent of the invention preferably represents 20% by mass to 99% by mass of the total mass of the solvent contained in the liquid crystal alignment agent. In particular, the proportion is preferably 20% by mass to 90% by mass, and more preferably 30% by mass to 80% by mass.

As long as the advantageous effects of the invention are not impaired, for the liquid crystal alignment agent of the invention, a solvent that enhances the film properties and surface smoothness of a liquid crystal alignment film at the time of the application of the liquid crystal alignment agent may be used (hereinafter, the solvent is also written as poor solvent). Specific examples of the poor solvents are listed below, but the poor solvents are not limited thereto.

Some example of poor solvents are ethanol, isopropyl alcohol, 1-butanol, 2-butanol, isobutyl alcohol, tert-butyl alcohol, 1-pentanol, 2-pentanol, 3-pentanol, 2-methyl-1-butanol, isopentyl alcohol, tert-pentyl alcohol, 3-methyl-2-butanol, neopentyl alcohol, 1-hexanol, 2-methyl-1-pentanol, 2-methyl-2-pentanol, 2-ethyl-1-butanol, 1-heptanol, 2-heptanol, 3-heptanol, 1-octanol, 2-octanol, 2-ethyl-1-hexanol, cyclohexanol, 1-methylcyclohexanol, 2-methylcyclohexanol, 3-methylcyclohexanol, 1,2-ethanediol, 1,2-propanediol, 1,3-propanediol, 1,2-butanediol, 1,3-butanediol, 1,4-butanediol, 2,3-butanediol, 1,5-pentanediol, 2-methyl-2,4-pentanediol, 2-ethyl-1,3-hexanediol, dipropyl ether, dibutyl ether, dihexyl ether, dioxane, ethylene glycol dimethyl ether, ethylene glycol diethyl ether, ethylene glycol dibutyl ether, 1,2-butoxyethane, diethylene glycol dimethyl ether, diethylene glycol diethyl ether, diethylene glycol methyl ethyl ether, diethylene glycol dibutyl ether, 2-pentanone, 3-pentanone, 2-hexanone, 2-heptanone, 4-heptanone, 3-ethoxybutyl acetate, 1-methylpentyl acetate, 2-ethylbutyl acetate, 2-ethylhexyl acetate, ethylene glycol monoacetate, ethylene glycol diacetate, propylene carbonate, ethylene carbonate, 2-(methoxymethoxy)ethanol, ethylene glycol monobutyl ether, ethylene glycol mono-iso-amyl ether, ethylene glycol monohexyl ether, 2-(hexyloxy)ethanol, furfuryl alcohol, diethylene glycol, propylene glycol, propylene glycol monobutyl ether, 1-(butoxyethoxy)propanol, propylene glycol monomethyl ether acetate, dipropylene glycol, dipropylene glycol monomethyl ether, dipropylene glycol monoethyl ether, dipropylene glycol dimethyl ether, tripropylene glycol monomethyl ether, ethylene glycol monomethyl ether acetate, ethylene glycol monoethyl ether acetate, ethylene glycol monobutyl ether acetate, ethylene glycol monoacetate, ethylene glycol diacetate, diethylene glycol monoethyl ether acetate, diethylene glycol monobutyl ether acetate, 2-(2-ethoxyethoxy)ethyl acetate, diethylene glycol acetate, triethylene glycol, triethylene glycol monomethyl ether, triethylene glycol monoethyl ether, methyl lactate, ethyl lactate, methyl acetate, ethyl acetate, n-butyl acetate, propylene glycol monomethyl ether acetate, methyl pyruvate, ethyl pyruvate, methyl 3-methoxypropionate, methyl ethyl 3-ethoxypropionate, ethyl 3-methoxypropionate, 3-ethoxypropionic acid, 3-methoxypropionic acid, propyl 3-methoxypropionate, butyl 3-methoxypropionate, methyl lactate ester, ethyl lactate ester, n-propyl lactate ester, n-butyl lactate ester, isoamyl lactate ester, and solvents represented by the aforementioned formulae [D-1] to [D-3].

In particular, 1-hexanol, cyclohexanol, 1,2-ethanediol, 1,2-propanediol, propylene glycol monobutyl ether, ethylene glycol monobutyl ether and dipropylene glycol dimethyl ether are preferably used.

The poor solvent preferably represents 1% by mass to 80% by mass of the total mass of the solvent contained in the liquid crystal alignment agent. In particular, the proportion is preferably 10% by mass to 80% by mass, and more preferably 20% by mass to 70% by mass.

As long as the advantageous effects of the invention are not impaired, the liquid crystal alignment agent of the invention may further contain polymers other than the polymers according to the invention; dielectrics or conductive materials for the purpose of changing the electrical characteristics such as dielectric constant and conductive properties of the liquid crystal alignment films; silane coupling agents for the purpose of enhancing the adhesion of the liquid crystal alignment films to the substrates; crosslinkable compounds for the purpose of enhancing the hardness and density of the liquid crystal alignment films; and imidization promoting agents for the purpose of allowing the thermal imidization of the polyimide precursor to proceed efficiently during the calcination of the films.

Specific examples of the silane coupling agents are listed below, but the silane coupling agents which may be used in the liquid crystal alignment agent of the invention are not limited thereto:

Amine-based silane coupling agents such as 3-aminopropyltriethoxysilane, 3-(2-aminoethyl)aminopropyltrimethoxysilane, 3-(2-aminoethyl)aminopropylmethyldimethoxysilane, 3-aminopropyltrimethoxysilane, 3-phenylaminopropyltrimethoxysilane, 3-triethoxysilyl-N-(1,3-dimethyl-butylidene)propylamine and 3-aminopropyldiethoxymethylsilane; vinyl-based silane coupling agents such as vinyltrimethoxysilane, vinyltriethoxysilane, vinyltris(2-methoxyethoxy)silane, vinylmethyldimethoxysilane, vinyltriacetoxysilane, vinyltriisopropoxysilane, allyltrimethoxysilane and p-styryltrimethoxysilane; epoxy-based silane coupling agents such as 3-glycidoxypropyltrimethoxysilane, 3-glycidoxypropyltriethoxysilane, 3-glycidoxypropylmethyldiethoxysilane, 3-glycidoxypropylmethyldimethoxysilane and 2-(3,4-epoxycyclohexyl) ethyltrimethoxysilane; methacrylic silane coupling agents such as 3-methacryloxypropylmethyldimethoxysilane, 3-methacryloxypropyltrimethoxysilane, 3-methacryloxypropylmethyldiethoxysilane and 3-methacryloxypropyltriethoxysilane; acrylic silane coupling agents such as 3-acryloxypropyltrimethoxysilane; ureide-based silane coupling agents such as 3-ureidopropyltriethoxysilane; sulfide-based silane coupling agents such as bis(3-(triethoxysilyl)propyl) disulfide and bis(3-(triethoxysilyl)propyl) tetrasulfide; mercapto-based silane coupling agents such as 3-mercaptopropylmethyldimethoxysilane, 3-mercaptopropyltrimethoxysilane and 3-octanoylthio-1-propyltriethoxysilane; isocyanate-based silane coupling agents such as 3-isocyanatopropyltriethoxysilane and 3-isocyanatopropyltrimethoxysilane; aldehyde-based silane coupling agents such as triethoxysilyl butyraldehyde; and carbamate-based silane coupling agents such as triethoxysilylpropyl methylcarbamate and (3-triethoxysilylpropyl)-t-butylcarbamate.

The silane coupling agent is added for the purpose of enhancing the adhesion of the polymer to the substrate. If the silane coupling agent is added in an excessively large amount, unreacted agent may adversely affect the liquid crystal alignment. If the amount is excessively small, the adhesion is not effectively enhanced. Thus, the amount is preferably 0.01 to 5.0% by mass, and more preferably 0.1 to 1.0% by mass relative to the solid content of the polymer.

Specific examples of the imidization promoting agents usable for the liquid crystal alignment agent that contains the polyimide precursor include, but are not limited thereto:

[Chemical Formula 34]

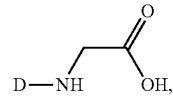
(I-1)

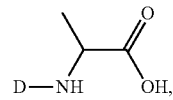
(I-2)

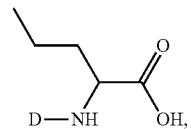
(I-3)

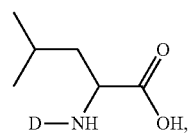
(I-4)

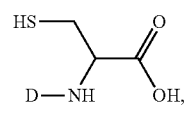
(I-5)

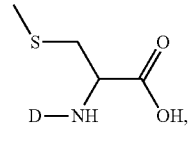
(I-6)

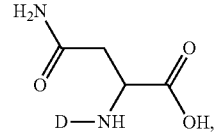
(I-7)

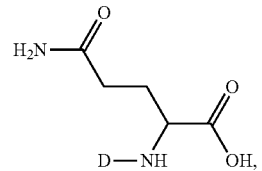
(I-8)

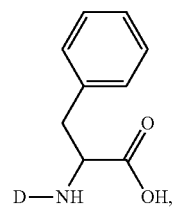
(I-9)

(I-10) 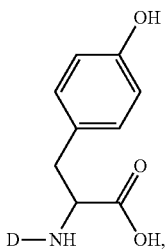

(I-11) 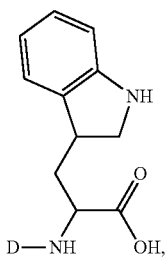

(I-12) 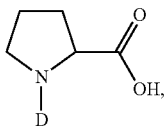

(I-13) 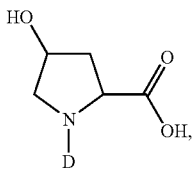

(I-14) 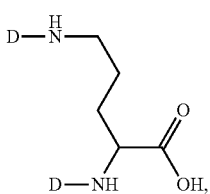

(I-15) 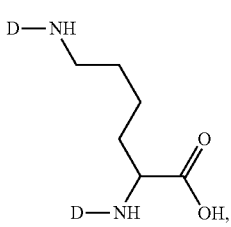

(I-16) 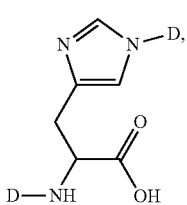

(I-17) 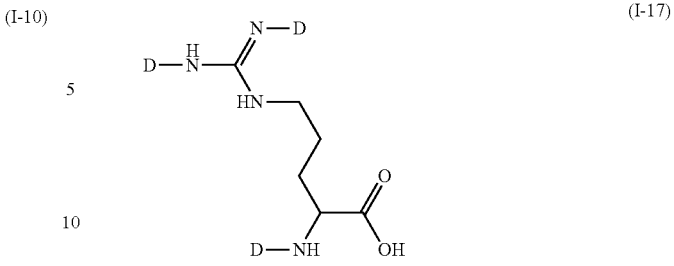

In the formulae (I-1) to (I-17), D independently at each occurrence is a t-butoxycarbonyl group, a 9-fluorenyl-methoxycarbonyl group or a carbobenzoxy group. The plurality of groups D present in each of the formulae (I-14) to (I-17) may be the same as or different from one another.

The content of the imidization promoting agent is not particularly limited as long as the agent can effectively promote the thermal imidization of the polyimide precursor. If forced to say, the lower limit of the content may preferably be not less than 0.01 mole, more preferably not less than 0.05 mole, and still more preferably not less than 0.1 mole per 1 mole of the amic acid or the ester moieties thereof contained in the polyimide precursor. To minimize adverse effects of the imidization promoting agent remaining in the calcined film on characteristics of the liquid crystal alignment film, the upper limit, if forced to say, of the content of the imidization promoting agent may preferably be not more than 2 mole, more preferably not more than 1 mole, and still more preferably not more than 0.5 mole per 1 mole of the amic acid or the ester moieties thereof contained in the polyimide precursor of the invention.

When an imidization promoting agent is added, it is preferable to add it after diluted with a good solvent and a poor solvent in view of the possibility of the imidization being promoted by heating.

Further, it is preferable to introduce into the liquid crystal alignment agent of the invention a crosslinkable compound having epoxy groups, isocyanate groups, oxetane groups or cyclocarbonate groups; a crosslinkable compound having at least one substituent selected from the group consisting of hydroxyl groups, hydroxyalkyl groups and lower alkoxyalkyl groups; or a crosslinkable compound having polymerizable unsaturated bonds. These crosslinkable compounds should have two or more of such substituents or polymerizable unsaturated bonds.

Examples of the crosslinkable compounds having epoxy groups or isocyanate groups include bisphenol acetone glycidyl ether, phenol novolak epoxy resin, cresol novolak epoxy resin, triglycidyl isocyanurate, tetraglycidyl aminodiphenylene, tetraglycidyl-m-xylenediamine, tetraglycidyl-1,3-bis(aminoethyl)cyclohexane, tetraphenyl glycidyl ether ethane, triphenyl glycidyl ether ethane, bisphenol hexafluoroacetodiglycidyl ether, 1,3-bis(1-(2,3-epoxypropoxy)-1-trifluoromethyl-2,2,2-trifluoromethyl)benzene, 4,4-bis(2,3-epoxypropoxy)octafluorobiphenyl, triglycidyl-p-aminophenol, tetraglycidyl metaxylenediamine, 2-(4-(2,3-epoxypropoxy)phenyl)-2-(4-(1,1-bis(4-(2,3-epoxypropoxy)phenyl)ethyl)phen yl)propane and 1,3-bis(4-(1-(4-(2,3-epoxypropoxy)phenyl)-1-(4-(1-(4-(2,3-epoxypropoxy)phenyl)-1-m ethylethyl)phenyl)ethyl)phenoxy)-2-propanol.

The crosslinkable compounds having oxetane groups are those which have at least two oxetane groups represented by the following formula [4A].

[Chemical Formula 35]

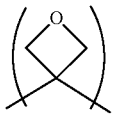
[4A]

Specific examples thereof include crosslinkable compounds represented by the formulae [4a] to [4k] described on pp. 58 to 59 of WO 2011/132751 (published Oct. 27, 2011).

The crosslinkable compounds having cyclocarbonate groups are those which have at least two cyclocarbonate groups represented by the following formula [5A].

[Chemical Formula 36]

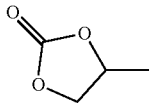
[5A]

Specific examples thereof include crosslinkable compounds represented by the formulae [5-1] to [5-42] described on pp. 76 to 82 of WO 2012/014898 (published Feb. 2, 2012).

Examples of the crosslinkable compounds having at least one substituent selected from the group consisting of hydroxyl groups and alkoxyl groups include amino resins having hydroxyl groups or alkoxyl groups, such as melamine resins, urea resins, guanamine resins, glycoluril-formaldehyde resins, succinylamide-formaldehyde resins and ethyleneurea-formaldehyde resins. Specifically, there can be used melamine derivatives, benzoguanamine derivatives and glycolurils, which are substituted with methylol groups, alkoxymethyl groups or both of these groups in place of hydrogen atoms in the amino groups. Such melamine derivatives or benzoguanamine derivatives may be dimers or trimers, and those compounds which have 3 to 6 methylol groups or alkoxymethyl groups on average per triazine ring are preferable.

Some example of commercially available melamine derivatives and benzoguanamine derivatives includes methoxymethylated melamines such as MX-750 which is substituted with 3.7 methoxymethyl groups on average per triazine ring, MW-30 which is substituted with 5.8 methoxymethyl groups on average per triazine ring (both manufactured by Sanwa Chemical Co., Ltd.) and CYMEL 300, 301, 303, 350, 370, 771, 325, 327, 703 and 712; methoxymethylated butoxymethylated melamines such as CYMEL 235, 236, 238, 212, 253 and 254; butoxymethylated melamines such as CYMEL 506 and 508; carboxyl group-containing methoxymethylated isobutoxymethylated melamines such as CYMEL 1141; methoxymethylated ethoxymethylated benzoguanamines such as CYMEL 1123; methoxymethylated butoxymethylated benzoguanamines such as CYMEL 1123-10; butoxymethylated benzoguanamines such as CYMEL 1128; and carboxyl group-containing methoxymethylated ethoxymethylated benzoguanamines such as CYMEL 1125-80 (all manufactured by Mitsui Cyanamid). Examples of the glycolurils include butoxymethylated glycolurils such as CYMEL 1170; methylolated glycolurils such as CYMEL 1172; and methoxymethylolated glycolurils such as Powderlink 1174.

Some example of the benzene or phenol compounds having hydroxyl groups or alkoxyl groups are 1,3,5-tris(methoxymethyl)benzene, 1,2,4-tris(isopropoxymethyl)benzene, 1,4-bis(sec-butoxymethyl)benzene and 2,6-dihydroxymethyl-p-tert-butylphenol.

More specific examples thereof include crosslinkable compounds of the formulae [6-1] to [6-48] described on pp. 62 to 66 of WO 2011/132751 (published Oct. 27, 2011).

Examples of the crosslinkable compounds having polymerizable unsaturated bonds include crosslinkable compounds having three polymerizable unsaturated groups in the molecule such as trimethylolpropane tri(meth)acrylate, pentaerythritol tri(meth)acrylate, dipentaerythritol penta(meth)acrylate, tri(meth)acryloyloxyethoxytrimethylolpropane and glycerol polyglycidyl ether poly(meth)acrylate; crosslinkable compounds having two polymerizable unsaturated groups in the molecule such as ethylene glycol di(meth)acrylate, diethylene glycol di(meth)acrylate, tetraethylene glycol di(meth)acrylate, polyethylene glycol di(meth)acrylate, propylene glycol di(meth)acrylate, polypropylene glycol di(meth)acrylate, butylene glycol di(meth)acrylate, neopentyl glycol di(meth)acrylate, ethylene oxide bisphenol A di(meth)acrylate, propylene oxide bisphenol di(meth)acrylate, 1,6-hexanediol di(meth)acrylate, glycerol di(meth)acrylate, pentaerythritol di(meth)acrylate, ethylene glycol diglycidyl ether di(meth)acrylate, diethylene glycol diglycidyl ether di(meth)acrylate, diglycidyl phthalate di(meth)acrylate and neopentyl glycol hydroxypivalate di(meth)acrylate; and crosslinkable compounds having one polymerizable unsaturated group in the molecule such as 2-hydroxyethyl (meth)acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, 3-chloro-2-hydroxypropyl (meth)acrylate, glycerol mono(meth)acrylate, 2-(meth)acryloyloxyethyl phosphate and N-methylol (meth)acrylamide.

Further, the compounds represented by the following formula [7A] can also be used.

[Chemical Formula 37]

$$E_1\text{—}(E_2)_n \quad \quad [7A]$$

In the formula [7A], $E_1$ is a group selected from the group consisting of cyclohexane ring, bicyclohexane ring, benzene ring, biphenyl ring, terphenyl ring, naphthalene ring, fluorene ring, anthracene ring and phenanthrene ring, $E_2$ is a group selected from the formulae [7a] and [7b] below, and n is an integer of 1 to 4.

[Chemical Formula 38]

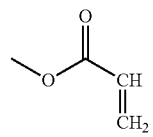
[7a]

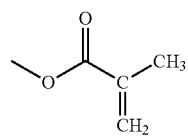
[7b]

The compounds described above are only examples, and the crosslinkable compounds are not limited thereto. A single crosslinkable compound or a combination of two or more crosslinkable compounds may be used in the liquid crystal alignment agent of the invention.

In the liquid crystal alignment agent of the invention, the content of the crosslinkable compound is preferably 0.1 to 150 parts by mass relative to 100 parts by mass of the total polymer components. To ensure that the crosslinking reaction takes place so as to provide the desired effects, the content is preferably 0.1 to 100 parts by mass, and more preferably 1 to 50 parts by mass relative to 100 parts by mass of the polymer components.

As long as the advantageous effects of the invention are not impaired, for the liquid crystal alignment agent of the invention, a compound which enhances the thickness uniformity and surface smoothness of a liquid crystal alignment film at the time of the application of the liquid crystal alignment agent may be used.

Examples of the compounds that enhance the thickness uniformity and surface smoothness of liquid crystal alignment films include fluorine surfactants, silicone surfactants and nonionic surfactants.

More specific examples thereof include EFTOP EF301, EF303 and EF352 (all manufactured by Tohkem Products Corp.), MEGAFACE F171, F173 and R-30 (all manufactured by DIC CORPORATION), Fluorad FC430 and FC431 (all manufactured by Sumitomo 3M Limited), and Asahi Guard AG710, Surflon S-382, SC101, SC102, SC103, SC104, SC105 and SC106 (all manufactured by Asahi Glass Co., Ltd.).

The amount of the surfactant used is preferably 0.01 to 2 parts by mass, and more preferably 0.01 to 1 part by mass relative to 100 parts by mass of the total polymer components contained in the liquid crystal alignment agent.

Further, the liquid crystal alignment agent may contain a nitrogen-containing heterocyclic amine compound represented by the formulae [M1] to [M156] described on pp. 69 to 73 of WO 2011/132751 (published Oct. 27, 2011), the compounds being capable of promoting charge transfer in the liquid crystal alignment film and facilitating the passage of charges through the device. Such an amine compound may be added directly to the liquid crystal alignment agent, but is preferably added in the form of a solution having a concentration of 0.1 to 10% by mass, or preferably 1 to 7% by mass. The solvent used here is not particularly limited as long as the polyimide or polyimide precursor of the invention is dissolved.

<<Liquid Crystal Alignment Films>>

The liquid crystal alignment film of the invention is a film obtained by applying the liquid crystal alignment agent onto a substrate, and drying and calcining the resultant coating. The substrate on which the liquid crystal alignment agent of the invention is applied is not particularly limited as long as the substrate has high transparency, and glass substrates, silicon nitride substrates, and plastic substrates such as acrylic substrates and polycarbonate substrates may be used. In view of simplification of the process, it is preferable to use a substrate having formed thereon ITO electrodes and other components for the driving of a liquid crystal. In the case where the liquid crystal display device is of reflection type, even a nontransparent substrate such as silicon wafer may be used on one side of the device. In this case, for the electrodes, a reflective material such as aluminum may also be used.

The method for applying the liquid crystal alignment agent of the invention includes spin coating, printing and inkjetting. The temperature and time in the steps of drying and calcining a coating of the liquid crystal alignment agent of the invention may be selected appropriately. Usually, the coating is dried at 50° C. to 120° C. for 1 minute to 10 minutes in order to sufficiently remove the organic solvent contained therein, and thereafter the film is calcined at 150° C. to 300° C. for 5 minutes to 120 minutes. The thickness of the film after the calcination is not particularly limited, but may be 5 to 300 nm, and preferably 10 to 100 nm because excessively small thickness may decrease the reliability of the liquid crystal display device.

A specific example of the photoaligning treatment method is such that a radiation polarized in a specific direction is applied onto the surface of the film and in some cases the film is further heat treated at a temperature of 150 to 250° C., thereby imparting the liquid crystal alignment ability. The radiation may be selected from UV light and visible light having wavelengths of 100 nm to 800 nm. Of these, UV light having a wavelength of 100 nm to 400 nm is preferable, and UV light having a wavelength of 200 nm to 400 nm is particularly preferable. To improve the liquid crystal alignment properties, the radiation may be applied while heating the coated substrate at 50 to 250° C. The dose of the radiation is preferably 1 to 10,000 mJ/cm$^2$, and particularly preferably 100 to 5,000 mJ/cm$^2$. A liquid crystal alignment film fabricated in the manner described above can align liquid crystal molecules in a specific direction stably. The UV light is preferably polarized with a higher extinction ratio because such light can impart higher anisotropy. Specifically, the extinction ratio of the linearly polarized UV light is preferably not less than 10:1, and more preferably not less than 20:1.

The film irradiated with the polarized radiation may be subsequently treated by contact with a solvent including at least one selected from water and organic solvents.

The solvents used in the contact treatment are not particularly limited as long as they can dissolve decomposition products formed by the irradiation. Specific examples thereof include water, methanol, ethanol, 2-propanol, acetone, methyl ethyl ketone, 1-methoxy-2-propanol, 1-methoxy-2-propanol acetate, butylcellosolve, ethyl lactate, methyl lactate, diacetone alcohol, methyl 3-methoxypropionate, ethyl 3-ethoxypropionate, propyl acetate, butyl acetate and cyclohexyl acetate. Two or more of these solvents may be used in combination.

From the points of view of versatility and safety, a more preferred solvent is at least one selected from the group consisting of water, 2-propanol, 1-methoxy-2-propanol and ethyl lactate. Water, 2-propanol, and a mixed solvent of water and 2-propanol are particularly preferable.

In the invention, the treatment for the film having been irradiated with the polarized radiation by contact with a solution including an organic solvent is preferably performed in a manner that allows for sufficient contact of the film with the liquid, such as immersion or ejection (spraying). In particular, the treatment is preferably performed by immersing the film into a solution including an organic solvent preferably for 10 seconds to 1 hour, and more preferably 1 to 30 minutes. The contact treatment may take place at room temperature or at elevated temperatures, and is preferably performed at 10 to 80° C., and more preferably 20 to 50° C. Where appropriate, the contact may be helped by ultrasonication or the like.

In order to remove the organic solvent contained in the solution used, the contact treatment may be followed by either or both of washing (rinsing) with a low-boiling solvent such as water, methanol, ethanol, 2-propanol, acetone or methyl ethyl ketone, and drying.

Further, the film resulting from the contact treatment with the solvent may be heated at 150° C. or above in order to drive off the solvent and to realign the molecular chains in the film. The heating temperature is preferably 150 to 300° C. Although the realignment of the molecular chains is facilitated at a higher temperature, heating at an excessively high temperature may give rise to the decomposition of the molecular chains. In view of this, the heating temperature is more preferably 180 to 250° C., and particularly preferably 200 to 230° C. The molecular chains may not be effectively realigned if the heating time is too short, or may be decomposed by excessively long heating. In view of this, the heating time is preferably 10 seconds to 30 minutes, and more preferably 1 minute to 10 minutes.

<<Liquid Crystal Display Devices>>

The liquid crystal display device of the invention is characterized by having a liquid crystal alignment film obtained by the above-described method for producing liquid crystal alignment films.

Specifically, a liquid crystal alignment film is formed from the liquid crystal alignment agent of the invention on a substrate by the above-described method for producing liquid crystal alignment films, and thereafter a liquid crystal cell is fabricated by a known method and the cell is used to constitute the liquid crystal display device of the invention.

The method of the fabrication of a liquid crystal cell will be described taking a liquid crystal display device with a passive matrix structure as an example. The liquid crystal display device may be of an active matrix structure in which switching elements such as TFT (thin film transistors) are disposed in pixel portions constituting the image display.

First, transparent glass substrates are provided. A common electrode is formed on one substrate, and a segmented electrode is formed on another substrate. For example, these electrodes may be ITO electrodes, and are patterned so that desired displaying of images is feasible. Next, an insulating film is formed on each of the substrates so as to cover the common electrode and the segmented electrode. For example, the insulating films may be $SiO_2$—$TiO_2$ films formed by sol-gel method.

Next, a liquid crystal alignment film of the invention is formed on each of the substrates. Next, one of the substrates is placed on the other so that their alignment films will be faced to each other, and the peripheries are bonded with a sealing material. To control the gap between the substrates, a spacer is usually mixed in the sealing material. It is preferable that a spacer for controlling the gap between the substrates be spread over the inner portions that are not sealed. A hole is formed in part of the sealing material so that a liquid crystal can be injected from the outside.

Next, a liquid crystal material is injected through the hole in the sealing material into the space created by the two substrates and the sealing material. Thereafter, the hole is sealed with an adhesive. The liquid crystal may be injected by a vacuum injection method or by using a capillary action in the air. Next, polarizers are installed. Specifically, a pair of polarizers is attached to the two substrates at the opposite side to the liquid crystal layer. A liquid crystal display device of the invention may be obtained through the steps described above.

In the invention, the sealing material is, for example, a resin which has a reactive group such as an epoxy group, an acryloyl group, a methacryloyl group, a hydroxyl group, an allyl group or an acetyl group and is curable by UV irradiation or heating. In particular, it is preferable to use a curable resin having both an epoxy group and a (meth) acryloyl group as the reactive groups.

To enhance adhesion and humidity resistance, an inorganic filler may be added to the sealing material used in the invention. Specific examples of the inorganic fillers which may be used include, but are not limited thereto, spherical silica, fused silica, crystalline silica, titanium oxide, titanium black, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, calcium silicate, aluminum silicate, lithium aluminum silicate, zirconium silicate, barium titanate, glass fibers, carbon fibers, molybdenum disulfide and asbestos. Spherical silica, fused silica, crystalline silica, titanium oxide, titanium black, silicon nitride, boron nitride, calcium carbonate, barium sulfate, calcium sulfate, mica, talc, clay, alumina, aluminum hydroxide, calcium silicate and aluminum silicate are preferable. Two or more of the inorganic fillers may be used as a mixture.

EXAMPLES

Hereinbelow, the present invention will be described in more detail in reference to Synthetic Examples, Examples and Comparative Examples; however, it should not be interpreted that the scope of the invention is limited to such examples.

<<Synthesis of Diamine Compounds of the Invention>>

The following analyzers and analytic conditions were used for the synthesis of diamine compounds of the invention.

($^1$H-NMR Measurement)

Apparatus: Varian NMR System 400NB (400 MHz) (manufactured by Varian)

Measurement solvents: $CDCl_3$ (deuterated chloroform), DMSO-$d_6$ (deuterated dimethyl sulfoxide)

Reference materials: TMS (tetramethylsilane) ($\delta$: 0.0 ppm, $^1$H), $CDCl_3$ ($\delta$: 77.0 ppm, $^{13}$C)

Diamine compounds of the invention were synthesized as described below.

Synthetic Example 1

Synthesis of 4-[2-(4-amino-2-fluorophenyl)ethoxy] aniline (Z-3)

(Step 1)

[Chemical Formula 39]

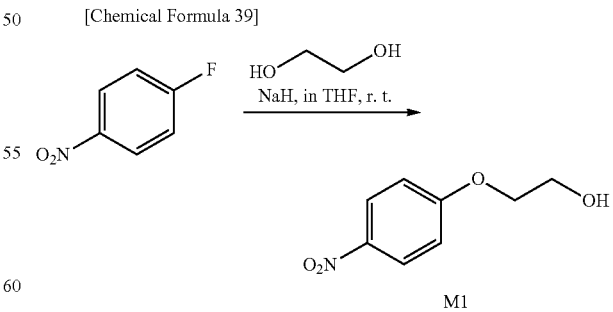

M1

60% Sodium hydride (44.0 g, 1,100 mmol) was added to a THF (tetrahydrofuran) solution (848 g) of 4-nitrofluorobenzene (141 g, 1,000 mmol) and ethylene glycol (1,220 g, 20 mol), and the reaction was performed at room temperature for 24 hours. Water (1,000 g) was added to the solution, and stirring was performed at room temperature for 2 hours. Thereafter, ethyl acetate (4,000 g) was added, and the liquid was washed with water (1,500 g) three times. The organic phase obtained was dried with magnesium sulfate. The magnesium sulfate was removed by filtration, and the filtrate was concentrated to give a crude product. The crude product was recrystallized from toluene (500 g) and ethyl acetate (400 g). Consequently, M1 was obtained as a white solid (yield: 48.8 g, 26%).

Ethylene Glycol Derivative (M1):

$^1$H-NMR (DMSO, δ ppm): 8.23-8.19 (m, 2H), 7.18-7.14 (m, 2H), 5.00-4.97 (m, 1H), 4.16-4.14 (m, 2H), 3.78-3.74 (m, 2H).

(Step 2)

[Chemical Formula 40]

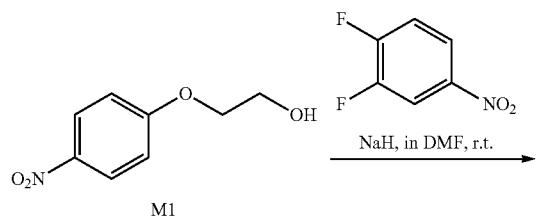

60% Sodium hydride (7.8 g, 195 mmol) was added to a DMF (dimethylformamide) solution (119 g) of M1 (23.8 g, 130 mmol) and 3,4-difluoronitrobenzene (24.8 g, 156 mmol), and the reaction was performed at room temperature for 1 hour. The solution was poured into water (1,000 g), and stirring was performed at room temperature for 2 hours. The crude product was recovered by filtration. The crude product obtained was recrystallized from acetonitrile (200 g). Consequently, M2 was obtained as a white solid (yield: 36.7 g, 88%).

Dinitro Compound (M2):

$^1$H-NMR (DMSO, δ ppm): 8.25-8.14 (m, 4H), 7.53-7.48 (m, 1H), 7.25-7.21 (m, 2H), 4.65-4.56 (m, 4H).

(Step 3)

[Chemical Formula 41]

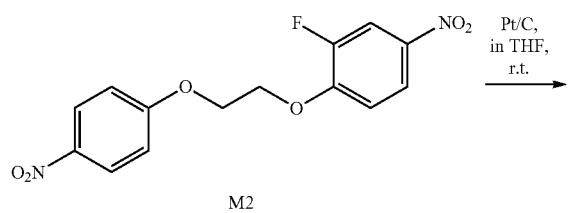

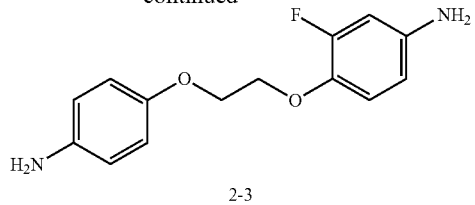

M2 (36.7 g, 114 mmol) and 5% platinum carbon (3.67 g, 10% by weight) were added to THF (184 g), and the mixture was stirred at room temperature for 24 hours in a hydrogen atmosphere. The resultant reaction liquid was filtered to remove the platinum carbon, and thereafter the filtrate was concentrated to give a crude product. The crude product was repulp washed using ethyl acetate (108 g) to give Z-3 (yield: 18.1 g, 61%).

Diamine Derivative (Z-3):

$^1$H-NMR (DMSO, δ ppm): 6.86 (t, 1H), 6.70-6.66 (m, 2H), 6.53-6.49 (m, 2H), 6.43-6.38 (m, 1H), 6.31-6.28 (m, 1H), 4.96 (s, 2H), 4.63 (s, 2H), 4.14-4.06 (m, 4H).

Synthetic Example 2

Synthesis of 1,2-bis(4-amino-2-methylphenoxy)ethane (Z-4)

(Step 1)

[Chemical Formula 42]

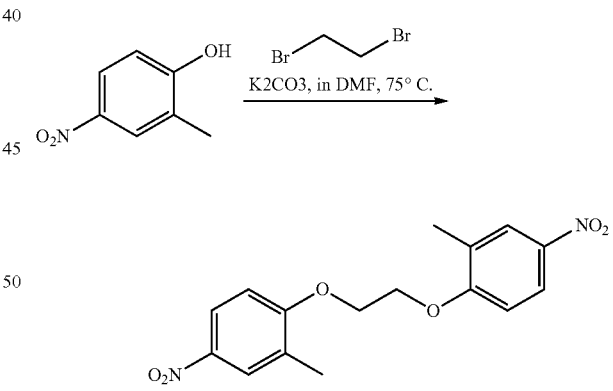

A DMF solution (282 g) of 4-nitro-o-cresol (48.2 g, 315 mmol), dibromoethane (28.2 g, 150 mmol) and potassium carbonate (49.8 g, 360 mmol) was stirred at 75° C. for 17 hours. The reaction liquid was poured into water (1,500 g), and the crude product was recovered by filtration. The crude product was repulp washed using methanol (80 g) to give M3 as a white solid (yield: 20.7 g, 42%).

Dinitro Compound (M3):

$^1$H-NMR (DMSO, δ ppm): 8.15-8.11 (m, 4H), 7.27 (d, 2H), 4.57 (s, 4H), 2.21 (s, 6H).

(Step 2)

[Chemical Formula 43]

A DMF solution of M3 (20.7 g, 62.4 mmol) and palladium carbon (2.72 g, 10% by weight) was stirred at room temperature for 2 days in a hydrogen atmosphere. The resultant reaction liquid was filtered to remove the palladium carbon, and thereafter the filtrate was concentrated to give a crude product. The crude product was recrystallized from acetonitrile (60 g) to give Z-4 (yield: 13.5 g, 80%).
Diamine Compound (Z-4):
$^1$H-NMR (DMSO, δ ppm): 6.65-6.63 (m, 2H), 6.36-6.30 (m, 4H), 4.51 (s, 4H), 4.04 (s, 4H), 2.02 (s, 6H).

<<Preparation of Liquid Crystal Alignment Agents of the Invention>>

The following analyzers and analytic conditions were used for the preparation of liquid crystal alignment agents of the invention.

[Viscosity]

The viscosity of a polyamic acid solution was measured on a sample of 1.1 mL at a temperature of 25° C. using cone-plate viscometer TVE-22H (manufactured by TOKI SANGYO CO., LTD) and cone rotor TE-1 (1° 34', R24).

[Solid Concentration]

The solid concentration of a polyamic acid solution was calculated in the following manner.

Approximately 1.1 g of the solution was measured out and placed into handled aluminum cup No. 2 (manufactured by AS ONE Corporation) and was heated in oven DNF400 (manufactured by Yamato) at 200° C. for 2 hours and allowed to stand at room temperature for 5 minutes. The weight of the solid remaining in the aluminum cup was measured. The solid concentration was calculated from this weight of the solid and the original weight of the solution.

[Molecular Weight]

The molecular weight of a polyamic acid was measured with GPC (room-temperature gel permeation chromatography) apparatus. The number average molecular weight (hereinafter, also Mn) and the weight average molecular weight (hereinafter, also Mw) were calculated relative to polyethylene glycols and polyethylene oxides.

GPC apparatus: GPC-101 manufactured by Shodex
Columns: KD803 and KD805 connected in series, manufactured by Shodex
Column temperature: 50° C.
Eluent: N,N-dimethylformamide (containing 30 mmol/L lithium bromide monohydrate (LiBr.H$_2$O), 30 mmol/L phosphoric acid anhydrous crystal (o-phosphoric acid) and 10 ml/L tetrahydrofuran (THF) as additives)

Flow rate: 1.0 ml/min

Calibration standard samples: TSK standard polyethylene oxides manufactured by TOSOH CORPORATION (weight average molecular weights (Mw): approximately 900,000, 150,000, 100,000 and 30,000) and polyethylene glycols manufactured by Polymer Laboratories Ltd. (peak-top molecular weights (Mp): approximately 12,000, 4,000 and 1,000). To avoid overlapping of peaks, two samples were analyzed separately, one being a mixture of four polymers with molecular weights 900,000, 100,000, 12,000 and 1,000, and the other being a mixture of three polymers with molecular weights 150,000, 30,000 and 4,000.

The following are tetracarboxylic dianhydride component, diamine components and additive used for the preparation of liquid crystal alignment agents of the invention.

(Tetracarboxylic Dianhydride Component)

Y-1: 1,3-dimethyl-1,2,3,4-cyclobutanetetracarboxylic dianhydride

[Chemical Formula 44]

(Y-1)

(Diamine Components)

Z-1: p-phenylenediamine

Z-2: 1,2-bis(4-aminophenoxy)ethane

Z-3: 4-[2-(4-amino-2-fluorophenyl)ethoxy]aniline (see Synthetic Example 1)

Z-4: 1,2-bis(4-amino-2-methylphenoxy)ethane (see Synthetic Example 2)

Z-5: N-methyl-2-(4-aminophenyl)ethylamine

[Chemical Formula 45]

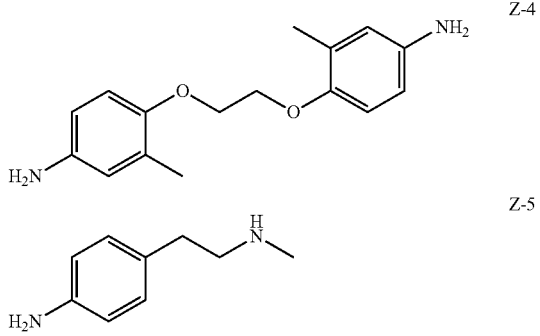

Z-4

Z-5

(Additive)
Additive A: N-α-(9-fluorenylmethoxycarbonyl)-N-τ-t-butoxycarbonyl-L-histidine The liquid crystal alignment agents of the invention were prepared as described below.

Example 1

A four-necked 100 mL flask containing a stirrer was loaded with 1.35 g (12.5 mmol) of (Z-1) and 3.28 g (12.5 mmol) of (Z-3). 65.7 g of N-methyl-2-pyrrolidone was added thereto to dissolve the compounds by stirring while feeding nitrogen. While stirring this diamine solution, 5.32 g (23.8 mmol) of (Y-1) was added, and 7.30 g of N-methyl-2-pyrrolidone was further added. The mixture was stirred in a nitrogen atmosphere at 40° C. for 12 hours to give a polyamic acid solution. The viscosity of the polyamic acid solution at 25° C. was 285 mPa·s. The molecular weights of the polyamic acid were Mn=12,300 and Mw=28,300.

A 19.4 g portion of the polyamic acid solution was added to a 100 mL conical flask containing a stirrer. Thereto were added 17.5 g of N-methyl-2-pyrrolidone, 9.31 g of butylcellosolve and 0.33 g of additive A. The mixture was stirred with a magnetic stirrer for 2 hours to yield a liquid crystal alignment agent.

Example 2

A four-necked 100 mL flask containing a stirrer was loaded with 1.35 g (12.5 mmol) of (Z-1) and 3.40 g (12.5 mmol) of (Z-4). 66.5 g of N-methyl-2-pyrrolidone was added thereto to dissolve the compounds by stirring while feeding nitrogen. While stirring this diamine solution, 5.32 g (23.8 mmol) of (Y-1) was added, and 7.39 g of N-methyl-2-pyrrolidone was further added. The mixture was stirred in a nitrogen atmosphere at 40° C. for 12 hours to give a polyamic acid solution. The viscosity of the polyamic acid solution at 25° C. was 318 mPa·s. The molecular weights of the polyamic acid were Mn=13,300 and Mw=31,400.

An 18.5 g portion of the polyamic acid solution was added to a 100 mL conical flask containing a stirrer. Thereto were added 16.7 g of N-methyl-2-pyrrolidone, 8.87 g of butylcellosolve and 0.31 g of additive A. The mixture was stirred with a magnetic stirrer for 2 hours to yield a liquid crystal alignment agent.

Comparative Example 1

A four-necked 100 mL flask containing a stirrer was loaded with 1.73 g (16.0 mmol) of (Z-1) and 3.91 g (16.0 mmol) of (Z-2). 81.7 g of N-methyl-2-pyrrolidone was added thereto to dissolve the compounds by stirring while feeding nitrogen. While stirring this diamine solution, 6.74 g (30.2 mmol) of (Y-1) was added, and 9.08 g of N-methyl-2-pyrrolidone was further added. The mixture was stirred in a nitrogen atmosphere at 40° C. for 12 hours to give a polyamic acid solution. The viscosity of the polyamic acid solution at 25° C. was 316 mPa·s. The molecular weights of the polyamic acid were Mn=12,300 and Mw=27,700.

An 18.7 g portion of the polyamic acid solution was added to a 100 mL conical flask containing a stirrer. Thereto were added 16.9 g of N-methyl-2-pyrrolidone, 8.96 g of butylcellosolve and 0.31 g of additive A. The mixture was stirred with a magnetic stirrer for 2 hours to yield a liquid crystal alignment agent.

Comparative Example 2

A four-necked 100 mL flask containing a stirrer was loaded with 8.52 g (38.0 mmol) of (Y-1). 82.0 g of N-methyl-2-pyrrolidone was added thereto to dissolve the compound by stirring while feeding nitrogen. While stirring this acid dianhydride solution, 3.90 g (36.1 mmol) of (Z-1) was added, and 9.11 g of N-methyl-2-pyrrolidone was further added. The mixture was stirred in a nitrogen atmosphere at 40° C. for 12 hours to give a polyamic acid solution. The viscosity of the polyamic acid solution at 25° C. was 368 mPa·s. The molecular weights of the polyamic acid were Mn=13,000 and Mw=27,000.

A 17.3 g portion of the polyamic acid solution was added to a 100 mL conical flask containing a stirrer. Thereto were added 15.6 g of N-methyl-2-pyrrolidone, 8.29 g of butylcellosolve and 0.29 g of additive A. The mixture was stirred with a magnetic stirrer for 2 hours to yield a liquid crystal alignment agent.

Comparative Example 3

A four-necked 100 mL flask containing a stirrer was loaded with 3.81 g (17.0 mmol) of (Y-1). 39.4 g of N-methyl-2-pyrrolidone was added thereto to dissolve the compound by stirring while feeding nitrogen. While stirring this acid dianhydride solution, 0.88 g (8.16 mmol) of (Z-1) and 1.28 g (8.50 mmol) of (Z-5) were added, and 4.39 g of N-methyl-2-pyrrolidone was further added. The mixture was stirred in a nitrogen atmosphere at 40° C. for 12 hours to give a polyamic acid solution. The viscosity of the polyamic acid solution at 25° C. was 357 mPa·s. The molecular weights of the polyamic acid were Mn=12,200 and Mw=24,000.

A 17.2 g portion of the polyamic acid solution was added to a 100 mL conical flask containing a stirrer. Thereto were added 15.5 g of N-methyl-2-pyrrolidone, 8.23 g of butylcellosolve and 0.29 g of additive A. The mixture was stirred with a magnetic stirrer for 2 hours to yield a liquid crystal alignment agent.

<<Fabrication of Liquid Crystal Cells Having Liquid Crystal Alignment Films of the Invention>>

Liquid crystal cells having liquid crystal alignment films of the invention were fabricated as described below.

Example 3

A liquid crystal cell having a configuration of an FFS liquid crystal display device was fabricated in the following manner.

First, a substrate having electrodes was provided. The substrate is a glass substrate having a size of 30 mm×35 mm and a thickness of 0.7 mm. The substrate bears, as a first layer, an IZO electrode with a solid pattern which defines a counter electrode. On the first layer that is the counter electrode, a SiN (silicon nitride) film formed by a CVD method is disposed as a second layer. The SiN film as the second layer has a film thickness of 500 nm and serves as an interlayer insulating film. On the second layer that is the SiN film, a comb-shaped pixel electrode formed by patterning of an IZO film is disposed as a third layer so as to define two pixels, the first pixel and the second pixel. The size of each pixel is 10 mm in length and about 5 mm in width. Here, the counter electrode as the first layer and the pixel electrode as the third layer are electrically insulated from each other by the action of the SiN film as the second layer.

The pixel electrode as the third layer has a comb shape in which the teeth are composed of an arrangement of a plurality of dogleg-shaped electrode elements bent at the center. The width in the lateral direction of each electrode element is 3 μm, and the intervals between the electrode elements is 6 μm. Because the pixel electrode defining each pixel is an arrangement of the plurality of dogleg-shaped electrode elements which are bent at the center, the shape of each pixel is not rectangular but is similar to a thick dogleg that is bent at the center just like the electrode elements. Each pixel has an upper first region and a lower second region which are divided up and down by the central bend.

The first region and the second region of each pixel are compared. The electrode elements of the pixel electrode which define these regions extend in different directions. That is, the first region of the pixel has the electrode elements of the pixel electrode tilted at an angle of +10° (clockwise) relative to the direction in which polarized UV light is applied to the liquid crystal alignment film as will be described later, and the second region of the pixel has the electrode elements of the pixel electrode tilted at an angle of −10° (clockwise). Thus, the first region and the second region of each pixel are configured so that the in-plane rotations (in-plane switching) of the liquid crystal induced by the application of voltage between the pixel electrode and the counter electrode take place in the opposite directions.

Next, the liquid crystal alignment agent obtained in Example 1 was filtered through a 1.0 μm filter, and was applied onto the above substrate provided with the electrodes by spin coating. The coating was dried on an 80° C. hot plate for 120 seconds and was calcined in a hot air circulation oven at 230° C. for 30 minutes. A polyimide film having a film thickness of 100 nm was thus formed. The polyimide film was irradiated, through a polarizer, with linearly polarized UV light (wavelength: 254 nm, dose: 200 mJ, irradiation direction: 10° inclined relative to the comb-shaped IZO electrode as the third layer). Thereafter, the film was calcined in a hot air circulation oven at 230° C. for 30 minutes, to give a substrate having a liquid crystal alignment film formed thereon.

As a counter substrate, a glass substrate was provided which had an ITO electrode on the backside and had a 4 μm high pillar spacer. A polyimide film was formed on this substrate in the similar manner, and by the same aligning procedures as described above, a substrate having a liquid crystal alignment film formed thereon was produced. These two substrates having the liquid crystal alignment films were assembled in such a manner that a sealing material was printed on one substrate while leaving a liquid crystal inlet, the other substrate was placed thereon so that the liquid crystal alignment films were faced to each other and the directions in which the UV irradiation had been performed were parallel to each other, and the sealing material was cured, to give an empty cell having a cell gap of 4 μm. Liquid crystal ML-7026 (manufactured by Merck Ltd.) was injected into the empty cell by a vacuum injection method, and the inlet was sealed, to give an FFS liquid crystal cell. Thereafter, the liquid crystal cell was heated at 110° C. for 30 minutes, allowed to stand at 23° C. overnight, and subjected to the evaluations described below. Table 1 shows the results.

Example 4

The same procedures as in Example 3 were repeated except that the liquid crystal alignment agent obtained in Example 1 was replaced by the liquid crystal alignment agent obtained in Example 2, to obtain a liquid crystal cell. The cell was subjected to the evaluations described later. Table 1 shows the results.

Comparative Example 4

The same procedures as in Example 3 were repeated except that the liquid crystal alignment agent obtained in Example 1 was replaced by the liquid crystal alignment agent obtained in Comparative Example 1, to obtain a liquid crystal cell. The cell was subjected to the evaluations described later. Table 1 shows the results.

Comparative Example 5

The same procedures as in Example 3 were repeated except that the liquid crystal alignment agent obtained in Example 1 was replaced by the liquid crystal alignment agent obtained in Comparative Example 2, to obtain a liquid crystal cell. The cell was subjected to the evaluations described later. Table 1 shows the results.

Comparative Example 6

The same procedures as in Example 3 were repeated except that the liquid crystal alignment agent obtained in Example 1 was replaced by the liquid crystal alignment agent obtained in Comparative Example 2 and that the UV dose was changed from 200 mJ to 800 mJ, to obtain a liquid crystal cell. The cell was subjected to the evaluations described later. Table 1 shows the results.

Comparative Example 7

The same procedures as in Example 3 were repeated except that the liquid crystal alignment agent obtained in Example 1 was replaced by the liquid crystal alignment agent obtained in Comparative Example 3 and that the UV dose was changed from 200 mJ to 400 mJ, to obtain a liquid crystal cell. The cell was subjected to the evaluations described later. Table 1 shows the results.

<<Evaluations of Liquid Crystal Cells>>

The analyzers and analytical conditions for evaluating the liquid crystal cells having the liquid crystal alignment films of the invention are as follows.

[Liquid Crystal Alignment]

The liquid crystal cell was subjected to an alternating voltage corresponding to 100% relative transmittance for 150 hours at a constant temperature of 60° C. and a frequency of 30 Hz.

Thereafter, a short circuit was caused between the pixel electrode and the counter electrode, and the liquid crystal cell was allowed to stand in that state at room temperature for one day.

After having been allowed to stand, the liquid crystal cell was placed between two polarizers arranged so that the polarization axes were perpendicular to each other. Without any voltage applied and with the illumination of a backlight, the angle of arrangement of the liquid crystal cell was adjusted so as to minimize the brightness of the transmitted light. The rotation angle ΔAngle was determined by the rotation of the liquid crystal cell from the angle at which the second region of the first pixel became the darkest to the angle at which the first region thereof became the darkest. For the second pixel, the second region and the first region thereof were compared to each other in the similar manner and the angle ΔAngle was determined. The average of the angle ΔAngle of the first pixel and the angle ΔAngle of the second pixel was calculated and the calculated average was taken as the angle ΔAngle of the liquid crystal cell. The smaller the value of the angle ΔAngle, the better the alignment of the liquid crystal.

[Inspection for Bright Spots]

The liquid crystal cell was observed under a polarizing microscope (ECLIPSE E600WPOL) (manufactured by Nikon Corporation), and the number of bright spots was counted. Specifically, the liquid crystal cell was placed between two polarizers arranged so that the polarization axes were perpendicular to each other, and was observed under the polarizing microscope with a magnification of five times (observed area: approximately 2,500 μm×2,500 μm). xx indicates 100 or more bright spots, x 10 to less than 100 bright spots, and ◯ less than 10 bright spots.

TABLE 1

| | Evaluation results | | Composition of polyimide | |
|---|---|---|---|---|
| | Liquid crystal alignment | Bright spots | Tetracarboxylic dianhydride component | Diamine components |
| Example 3 | 0.05 | ◯ | Y-1 | Z-1(50), Z-3(50) |
| Example 4 | 0.08 | ◯ | Y-1 | Z-1(50), Z-4(50) |
| Comparative Example 4 | 0.04 | XX | Y-1 | Z-1(50), Z-2(50) |
| Comparative Example 5 | 0.49 | ◯ | Y-1 | Z-1 |
| Comparative Example 6 | 0.21 | X | Y-1 | Z-1 |
| Comparative Example 7 | 0.41 | ◯ | Y-1 | Z-1(50), Z-5(50) |

INDUSTRIAL APPLICABILITY

The use of the liquid crystal alignment agent of the invention makes it possible to obtain a photoalignable or photoaligned liquid crystal alignment film that does not cause bright spots and offers good afterimage characteristics even in the case where a negative liquid crystal is used. Thus, the liquid crystal alignment agent can be used for liquid crystal display devices requiring high display quality.

The invention claimed is:

1. A liquid crystal alignment agent, comprising:
a polyimide or polyimide precursor,
wherein the polyimide or polyimide precursor is obtained by reacting a tetracarboxylic dianhydride of formula (1):

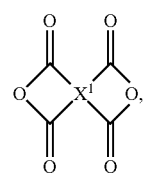

(1)

or a derivative thereof,
wherein $X^1$ is a tetravalent organic group, with a diamine component comprising a diamine of formula (2):

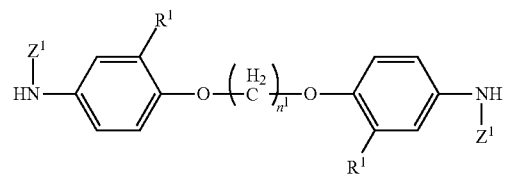

(2)

wherein
$R^1$ independently at each occurrence is a hydrogen atom, a methyl group or a fluorine atom, at least one $R^1$ is a methyl group or a fluorine atom;
$Z^1$ independently at each occurrence is a hydrogen atom or an optionally substituted C1-6 alkyl, C2-6 alkenyl or C2-6 aralkyl group; and
$n^1$ is 1 or 2.

2. The liquid crystal alignment agent of claim 1,
wherein the polyimide or polyimide precursor comprises a structural unit of formula (I):

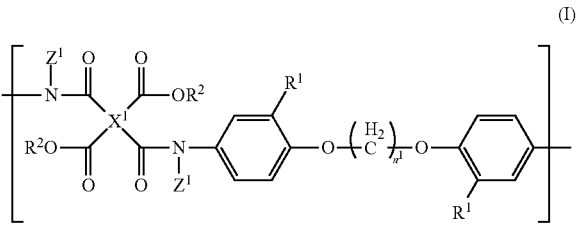

(I)

wherein
$R^1$ independently at each occurrence is a hydrogen atom, a methyl group or a fluorine atom, at least one $R^1$ is a methyl group or a fluorine atom;
$R^2$ independently at each occurrence is a hydrogen atom or a C1-6 alkyl group;
$X^1$ is a group selected from the group consisting of formulae (X1-1) to (X1-9):

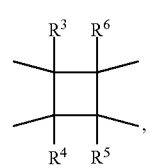

(X1-1)

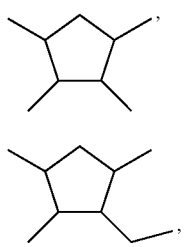 (X1-2),

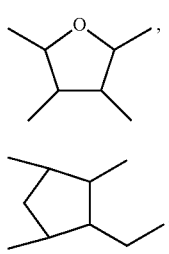 (X1-3),

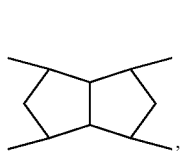 (X1-4),

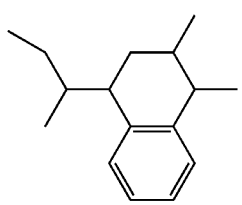 (X1-5), (X1-6)

(X1-7)

(X1-8) 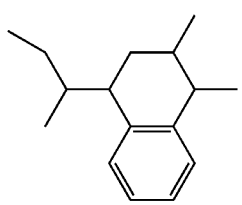 and

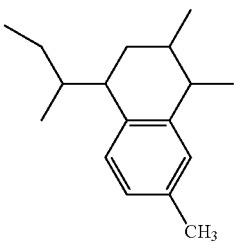 (X1-9)

wherein $R^3$, $R^4$, $R^5$ and $R^6$ are each independently a hydrogen atom, a halogen atom, a C1-6 alkyl group, a C2-6 alkenyl group, a C2-6 alkynyl group or a phenyl group;

$Z^1$ independently at each occurrence is a hydrogen atom or an optionally substituted C1-6 alkyl, C2-6 alkenyl or C2-6 aralkyl group; and $n^1$ is 1 or 2.

3. The liquid crystal alignment agent of claim 1, wherein $X^1$ is a group of formula (X1-1):

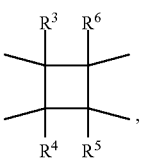 (X1-1)

wherein $R^3$, $R^4$, $R^5$ and $R^6$ are each independently a hydrogen atom, a halogen atom, a C1-6 alkyl group, a C2-6 alkenyl group, a C2-6 alkynyl group or a phenyl group.

4. The liquid crystal alignment agent of claim 2, wherein the polyimide or polyimide precursor comprises the structural units of the formula (I) in a proportion of not less than 20% by mole relative to the total structural units.

5. A liquid crystal alignment film obtained using the liquid crystal alignment agent of claim 1.

6. A liquid crystal alignment film obtained by applying the liquid crystal alignment agent of claim 1 onto a substrate and subjecting the agent-applied substrate to photoalignment.

7. A liquid crystal display device, comprising the liquid crystal alignment film of claim 5.

\* \* \* \* \*